(12) United States Patent
Bonner

(10) Patent No.: US 7,864,673 B2
(45) Date of Patent: Jan. 4, 2011

(54) DYNAMIC DUAL-MODE SERVICE ACCESS CONTROL, LOCATION-BASED BILLING, AND E911 MECHANISMS

(75) Inventor: Thomas W. Bonner, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 900 days.

(21) Appl. No.: 11/159,606

(22) Filed: Jun. 23, 2005

(65) Prior Publication Data

US 2007/0008885 A1   Jan. 11, 2007

Related U.S. Application Data

(60) Provisional application No. 60/683,992, filed on May 24, 2005.

(51) Int. Cl.
*H04B 7/00* (2006.01)
*H04J 1/16* (2006.01)
*H04L 12/28* (2006.01)

(52) U.S. Cl. .................. 370/230; 370/310; 370/392

(58) Field of Classification Search .............. 370/230, 370/310; 455/67.11, 423
See application file for complete search history.

(56) References Cited

U.S. PATENT DOCUMENTS

| | | | |
|---|---|---|---|
| 5,940,755 A | 8/1999 | Scott |
| 6,240,285 B1 | 5/2001 | Blum et al. |
| 6,457,129 B2 | 9/2002 | O'Mahony |
| 6,647,426 B2 | 11/2003 | Mohammed |
| 6,677,894 B2 | 1/2004 | Sheynblat et al. |
| 6,845,092 B2 | 1/2005 | Vassilovski et al. |
| 6,853,851 B1 | 2/2005 | Rautiola et al. |
| 6,925,378 B2 | 8/2005 | Tzamaloukas |
| 6,975,873 B1 | 12/2005 | Banks et al. |
| 6,993,319 B2 | 1/2006 | Himmel et al. |
| 7,603,102 B1 | 10/2009 | Pryor |
| 2002/0126701 A1 | 9/2002 | Requena |
| 2003/0069974 A1 | 4/2003 | Lu et al. |
| 2003/0131023 A1 | 7/2003 | Bassett et al. |
| 2003/0156566 A1 | 8/2003 | Griswold et al. |
| 2003/0225893 A1 | 12/2003 | Roese et al. |

(Continued)

OTHER PUBLICATIONS

International Search Report dated Sep. 20, 2007 for PCT Application Serial No. PCT/US/06/19408, 2 Pages.

(Continued)

*Primary Examiner*—Chirag G Shah
*Assistant Examiner*—Srinivasa R Reddivalam

(57) ABSTRACT

Architecture that facilitates the validation and authentication of the physical location of the dual-mode handset in a VoW-LAN solution (e.g., UMA (Unlicensed Mobile Access)) system and a cellular wireless service, thereby restricting the handset from gaining access from unauthorized locations. Thus, access to dual-mode service (e.g., UMA), for example, at a particular location (e.g., in a subscriber's home, or in a hot spot that is controlled by carrier) can now be managed to allow or deny service at a certain location. Another aspect of the invention is the capability to perform location-based billing. For example, if the subscriber is at home, the call may be free. Alternatively, if the subscriber is at a remote location (e.g., a retail establishment), it is now possible to charge for that connection at a different fee. Additionally, a location can now be assigned; for example, to assign a location for E911 compliance.

29 Claims, 19 Drawing Sheets

U.S. PATENT DOCUMENTS

| | | |
|---|---|---|
| 2004/0125781 A1 | 7/2004 | Walter et al. |
| 2004/0174900 A1 | 9/2004 | Volpi et al. |
| 2004/0192211 A1 | 9/2004 | Gallagher et al. |
| 2004/0203910 A1 | 10/2004 | Hind et al. |
| 2004/0224682 A1 | 11/2004 | Kang |
| 2004/0259541 A1 | 12/2004 | Hicks, III et al. |
| 2005/0026650 A1 | 2/2005 | Russell |
| 2005/0122921 A1 | 6/2005 | Seo |
| 2005/0147247 A1 | 7/2005 | Westberg et al. |
| 2005/0148353 A1* | 7/2005 | Hicks et al. ............. 455/466 |
| 2005/0181805 A1* | 8/2005 | Gallagher ............. 455/456.1 |
| 2005/0239441 A1 | 10/2005 | Eronen |
| 2005/0266859 A1* | 12/2005 | Tejani et al. ............ 455/456.4 |
| 2006/0002189 A1 | 1/2006 | Berkman |
| 2006/0094431 A1 | 5/2006 | Saifullah et al. |
| 2007/0238448 A1 | 10/2007 | Gallagher et al. |
| 2008/0125120 A1* | 5/2008 | Gallagher et al. ........ 455/435.2 |

OTHER PUBLICATIONS

International Search Report dated Sep. 21, 2006 for PCT Application Serial No. PCT/US06/19258, 3 Pages.
OA dated Apr. 13, 2009 for U.S. Appl. No. 11/379,022, 21 pages.
OA dated Jan. 6, 2010 for U.S. Appl. No. 11/379,022, 22 pages.
OA dated Oct. 6, 2008 for U.S. Appl. No. 11/379,022, 28 pages.
OA dated Jun. 9, 2010 for U.S. Appl. No. 11/379,022, 24 pages.

* cited by examiner

⤺ 600

| IMSI | IP ADDRESS | BROADBAND ID | LOCATION |
|---|---|---|---|

| IMSI | IP ADDRESS | BROADBAND ID | LOCATION BILLING CODE | LOCATION ADDRESS | LOCATION GEO COORDINATES |
|---|---|---|---|---|---|

*FIG. 6B*

DYNAMIC DUAL-MODE SERVICE ACCESS CONTROL, LOCATION-BASED BILLING, AND E911 MECHANISMS

CROSS-REFERENCE TO RELATED APPLICATIONS

This application claims the benefit of U.S. Provisional Patent application Ser. No. 60/683,992 entitled "DYNAMIC DUAL-MODE SERVICE ACCESS CONTROL, LOCATION-BASED BILLING, AND E911 MECHANISMS" and filed May 24, 2005, the entirety of which is incorporated by reference herein.

TECHNICAL FIELD

This invention relates to multimode services in a cellular network, and more specifically, to access control, billing and E911 services associated therewith.

BACKGROUND

The rapid advances and convergence of cellular and IP technologies poses many new challenges for a provider in terms of not only meeting consumer demands for IP and cellular services, but also in ensuring that such services are not compromised such that the provider loses revenue. Broadband communications carriers (e.g., DSL-Digital Subscriber Line and cable television systems) are continually offering increased bandwidth for data downloads and uploads to subscribers over the Internet as a means of not only providing data services for the ever-demanding multimedia technologies, but also for voice communications utilizing VoIP (voice over IP).

Conventionally, in the context of a DSL and wireless application, a DSL modem can be provided that is the connection to a broadband carrier. Typically, the DSL modem includes at least one port for receiving a WiFi access point (AP). WiFi, or Wireless Fidelity, is defined according to standards by IEEE 802.11 (a, b, g, etc.), and allows connection to the Internet from a couch at home, a bed in a hotel room, or a conference room at work, without wires. WiFi is similar to that used in a cell phone that enables such devices, e.g., computers, to send and receive data indoors and out; anywhere within the range of a base station. In order to access the broadband services, a Point-to-Point Protocol over Ethernet (PPPoE) authentication service is provided so that the subscriber, via a handset, can access the wide area network link.

Unlicensed Mobile Access (UMA) technology provides access to GSM (Global System for Mobile Communications) and GPRS (General Packet Radio Service) mobile services over unlicensed spectrum technologies (e.g., Bluetooth™ and IEEE 802.11x media). UMA technology provides alternative access to the GSM and GPRS core network services via IP-based broadband connections. Utilizing UMA, subscribers are able to roam and experience handover between cellular networks and public/private unlicensed wireless networks using multi-mode (e.g., dual-mode) mobile handsets, thereby receiving a consistent user experience when moving between networks.

In operation, a mobile subscriber with a UMA-enabled, dual-mode handset moves into range of an unlicensed wireless network to which the handset is allowed to connect. When the connection is made, the handset contacts a UNC (UMA Network Controller) over the broadband IP access network to be authenticated and authorized for GSM voice and GPRS data services via the unlicensed network. When approved, the subscriber's current location data stored in the core network is updated. From that point forward, all mobile voice and data traffic is routed to the handset via a UMAN (UMA Network) rather than the cellular radio access network. When the subscriber moves outside the range of the unlicensed network to which they are connected, the UNC and handset facilitate connection back to the licensed outdoor network, the whole process of which is transparent to the user.

The access point (AP) in the broadband service is transparent to the UMA technology. As long as the UMA client has an IP connection, and has a destination address, signaling can flow from the handset to the UNC, and login can occur. A secure tunnel is then established from the UNC back to the client and the GSM authentication procedures can be initiated to the UNC and access allowed. The UNC (and/or using WiFi) does not provide authentication, does not validate, and cannot determine the physical location of the handset. Thus, it is possible for a subscriber take a WiFi AP and the DSL modem to another location (e.g., a neighbor's house) and make the connection from the other location without the DSL carrier ever knowing, thereby circumventing revenues to the carrier. This also has a negative impact with respect to E911 services where the location of the subscriber is desired to be known.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention disclosed and claimed herein, in one aspect thereof, comprises architecture that facilitates the validation and authentication of the physical location of the dual-mode handset in a VoWLAN and/or wireless cellular network (e.g., a UMA (Unlicensed Mobile Access) system), thereby restricting the handset from gaining access from unauthorized locations. Thus, access to dual-mode service (e.g., UMA), for example, at a particular location (e.g., in a subscriber's home, or in a hot spot that is controlled by a carrier) can now be managed to allow or deny service at a certain location. Broadband networks can include a cable television IP networks, a DSL-type broadband network, a WiMax network, and a satellite-based IP network, for example.

Another aspect of the invention is the capability to perform location-based billing. For example, if the subscriber is at home, the call may be free. Alternatively, if the subscriber is at a remote location (e.g., a retail establishment), it is now possible to charge for that connection at a different fee.

In another aspect thereof, a location can now be assigned; for example, to assign a location for E911 compliance.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and

BRIEF DESCRIPTION OF THE DRAWINGS

FIGS. 6A and 6B illustrate examples of record formats that can be employed.

DETAILED DESCRIPTION

Figure 1:
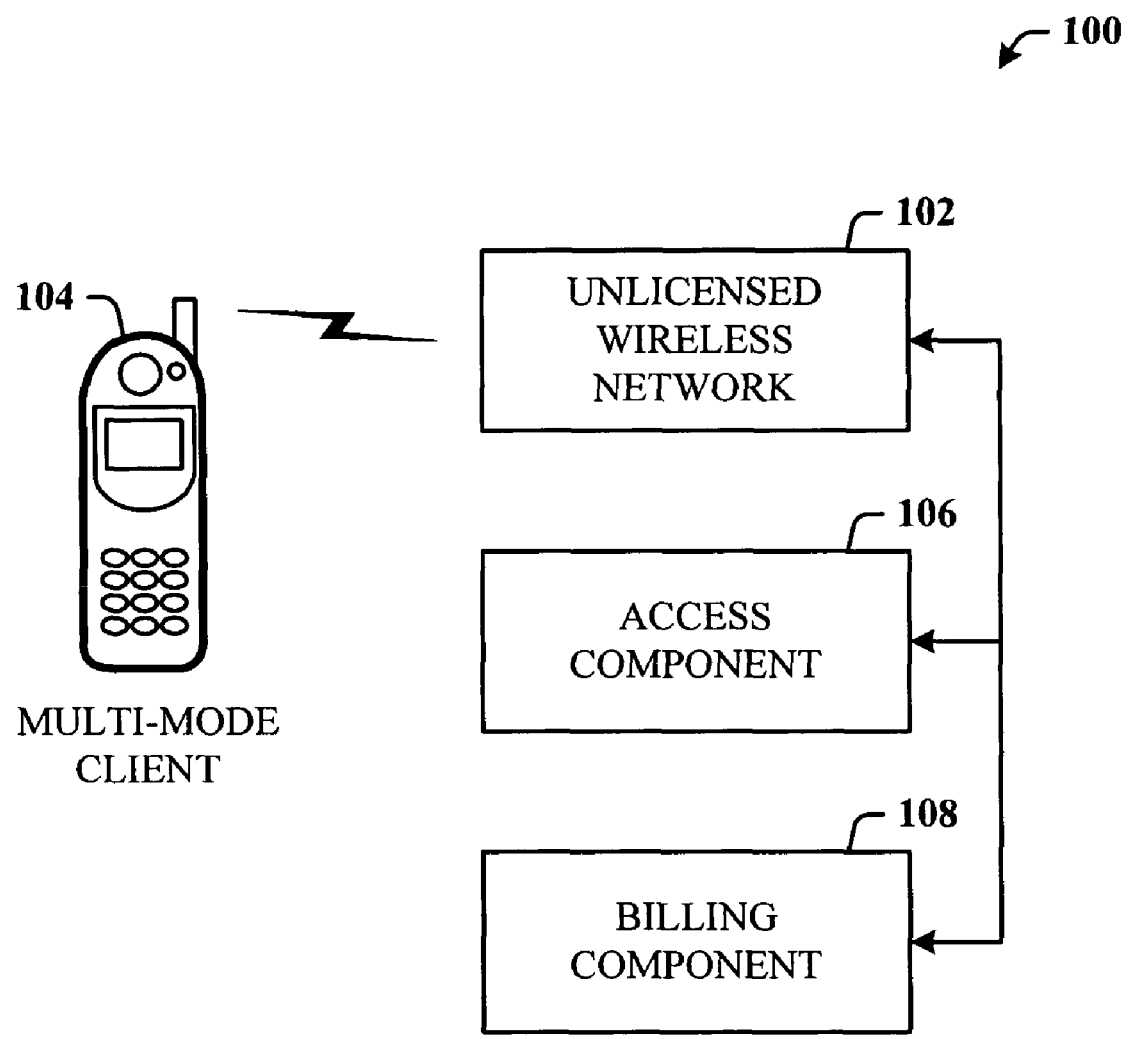
FIG. 1 illustrates a system that facilitates control of network access.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The FCC (Federal Communications Commission) 05-116 VoIP E911 rules require all interconnected VoIP (voice over IP) providers to support E911 calls within 120 days. Although the customer provides the location information, the VoIP provider provides the customer a means of updating this information, whether he or she is at home or away from home. A mechanism to dynamically validate the broadband endpoint is desired if the subscriber is allowed to use more than one broadband endpoint, such as hotspots, for example.

Described herein is a service-provider perspective on managing where subscribers may use WiFi to access DMS (dual-mode services). For the purpose of illustrating this concept, the DMS technology is assumed to be UMA (unlicensed mobile access) but could be IMS (IP multimedia subsystem) VoIP. This service-provider perspective offers a concept to build upon existing UMA and broadband security procedures to enable a UNC-SGW (UMA network controller-security gateway) to validate the originating IP address of a UMA client. In one solution, the physical location of the broadband endpoint is used to control DMS access, provide dynamic location based billing, and dynamically comply with E911 regulations.

The innovation targets the DSL (digital subscriber line) broadband network, although the same concept may be applied to non-DSL networks such as cable modem networks. It is desired to employ a mechanism that has zero impact on the broadband endpoints and terminal devices.

In one implementation, the DMS does not restrict the physical endpoint. The broadband service and RBGW (residential broadband gateway) are transparent to the DMS.

Note that for the purposes of illustrating the innovation, the DMS technology will be described in the context of UMA, but can also be IMS VoIP technology.

Referring initially to the drawings, FIG. 1 illustrates a system 100 that facilitates control of network access. The subject innovation facilitates validation and authentication of the physical location of a multi-mode (e.g., DMS) UMA system, thereby restricting the handset from gaining access from unauthorized locations. Thus, access to dual-mode UMA services, for example, at a particular location (e.g., in a subscriber's home, or in a hot spot that is controlled by a carrier) can now be managed to allow or deny service at that location.

Accordingly, the system 100 includes an unlicensed wireless network (UWN) 102 that facilitates communications for a multi-mode UMA client 104 to a radio network. An access component 106 of the radio network is provided that controls access to the radio network by the UMA client 104 based on a physical location of the UMA client 104. In one implementation, the UMA client 104 is a dual-mode mobile handset. The UWN 102 can be a broadband IP network such as a digital subscriber line (DSL) technology, a cable television network, T1/E1, broadband wireless, FTTH (Fiber to the Home), . . . . The radio network can be a GSM (global system for mobile telecommunications) network and/or a GPRS (general packet radio services) network.

The UWN 102 typically includes a modem (e.g., DSL and/or cable modem) that includes a unique identifier (e.g., a MAC address). Moreover, the modem is assigned a unique IP address by the provider, which IP address is then assigned to the subscriber account information such that the location of the modem can be determined. Thus, with respect to validation, when the UMA client 104 is utilized using existing GSM protocols and procedures, the validation request is encapsulated in IP and routed through the broadband connection gaining access to the GSM network to provide the same data and voice services that are provided on the GSM, while in the unlicensed WiFi network, using the broadband connection (e.g., DSL) as the GSM transport. A server on the radio network provides the mapping from the modem MAC address to the handset to the subscriber home location (where the physical location is the subscriber's home).

Now that the physical location of the client 104 can be known, the system 100 can further comprise a billing component 108 that facilitates billing based on the physical location of the client 104. For example, if the subscriber is at home, the call via a handset that employs the client can be structured by the provider to be free. However, if the subscriber is making a call via the UMA client handset at a remote location (e.g., a retail establishment), it is now possible to charge for that connection at a different fee. Furthermore, now that the physical location of the UMA client handset can be determined, this furthers the mandates of E911 compliance.

Figure 2:
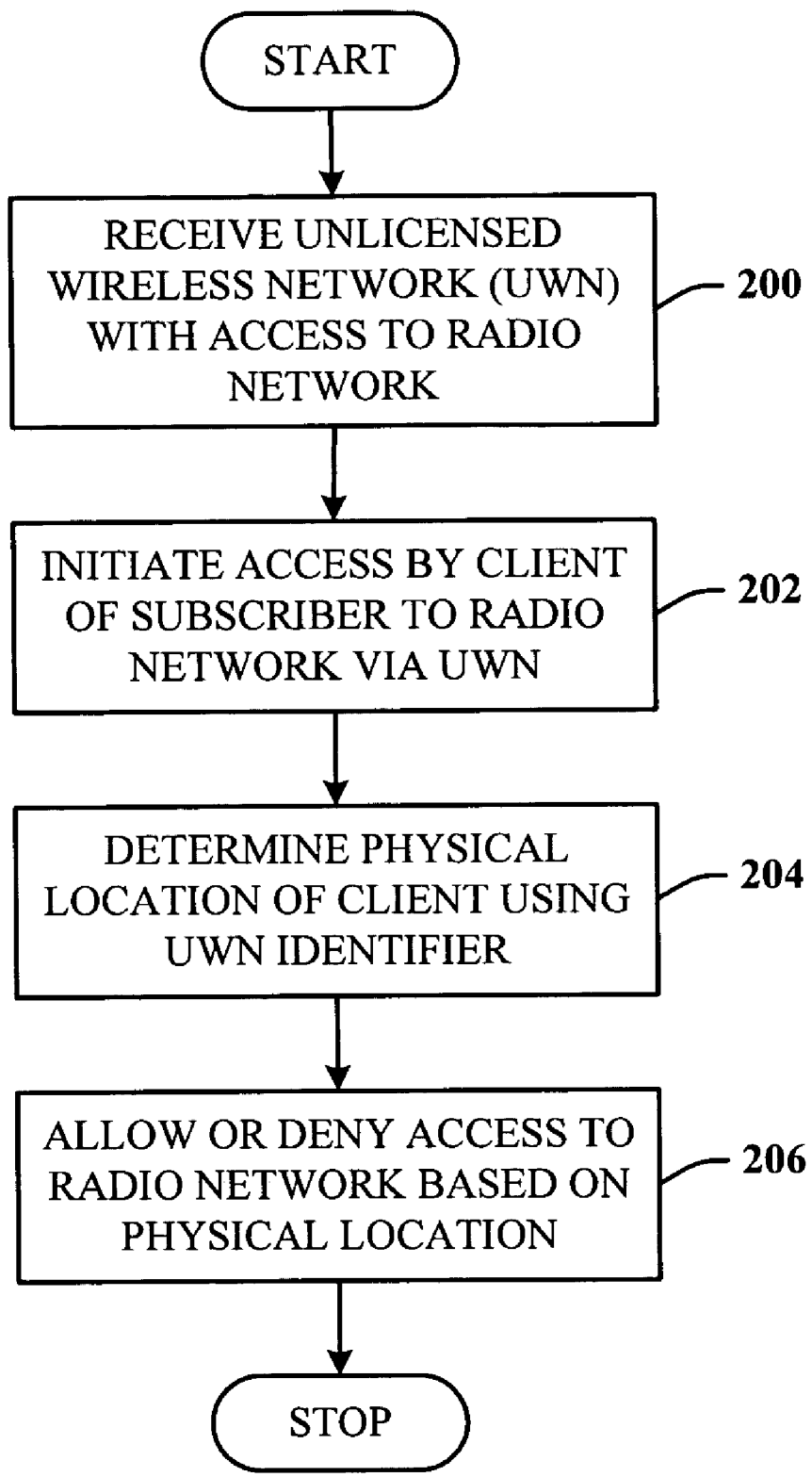
FIG. 2 illustrates a methodology of controlling network access in accordance with the subject innovation.

FIG. 2 illustrates a methodology of controlling network access in accordance with the subject innovation. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a UWN that supports IP packets is received that provides access to a radio network. At 202, a client (e.g., UMA) of a subscriber initiates access to the radio network via the UWN. At 204, the physical location of the client is determined using a UWN identifier. At 206, access to the radio network is either allowed or denied based on the physical location of the client.

Figure 3:
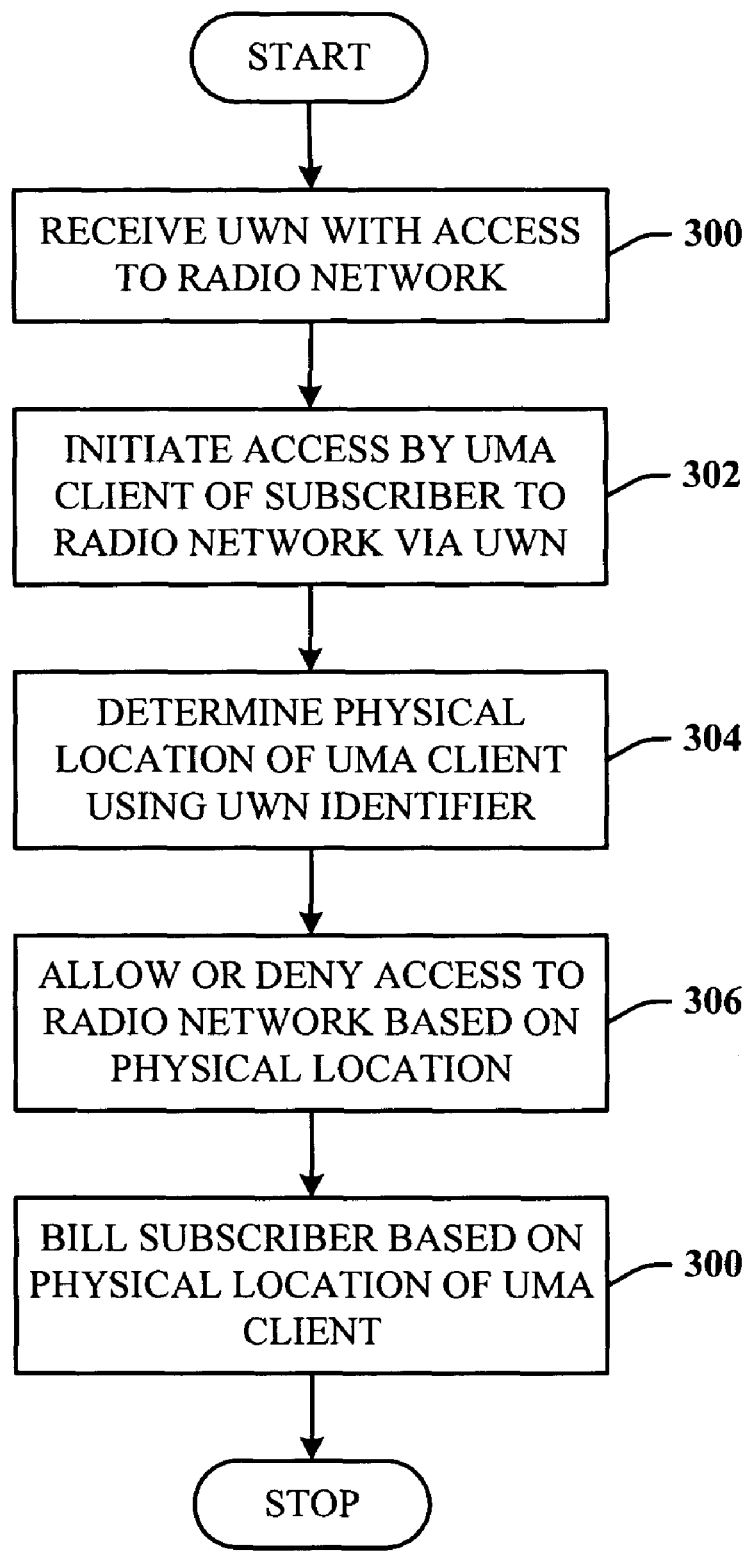
FIG. 3 illustrates a methodology of providing location-based billing in accordance with another aspect.

Referring now to FIG. 3, there is illustrated a methodology of providing location-based billing for a UMA client in accordance with another aspect. At 300, a UWN that supports IP packets is received that provides access to a radio network. At 302, a UMA client of a subscriber initiates access to the radio network via the UWN. At 304, the physical location of the UMA client is determined using a UWN identifier. At 306, access to the radio network is either allowed or denied based on the physical location of the UMA client.

Figure 4:
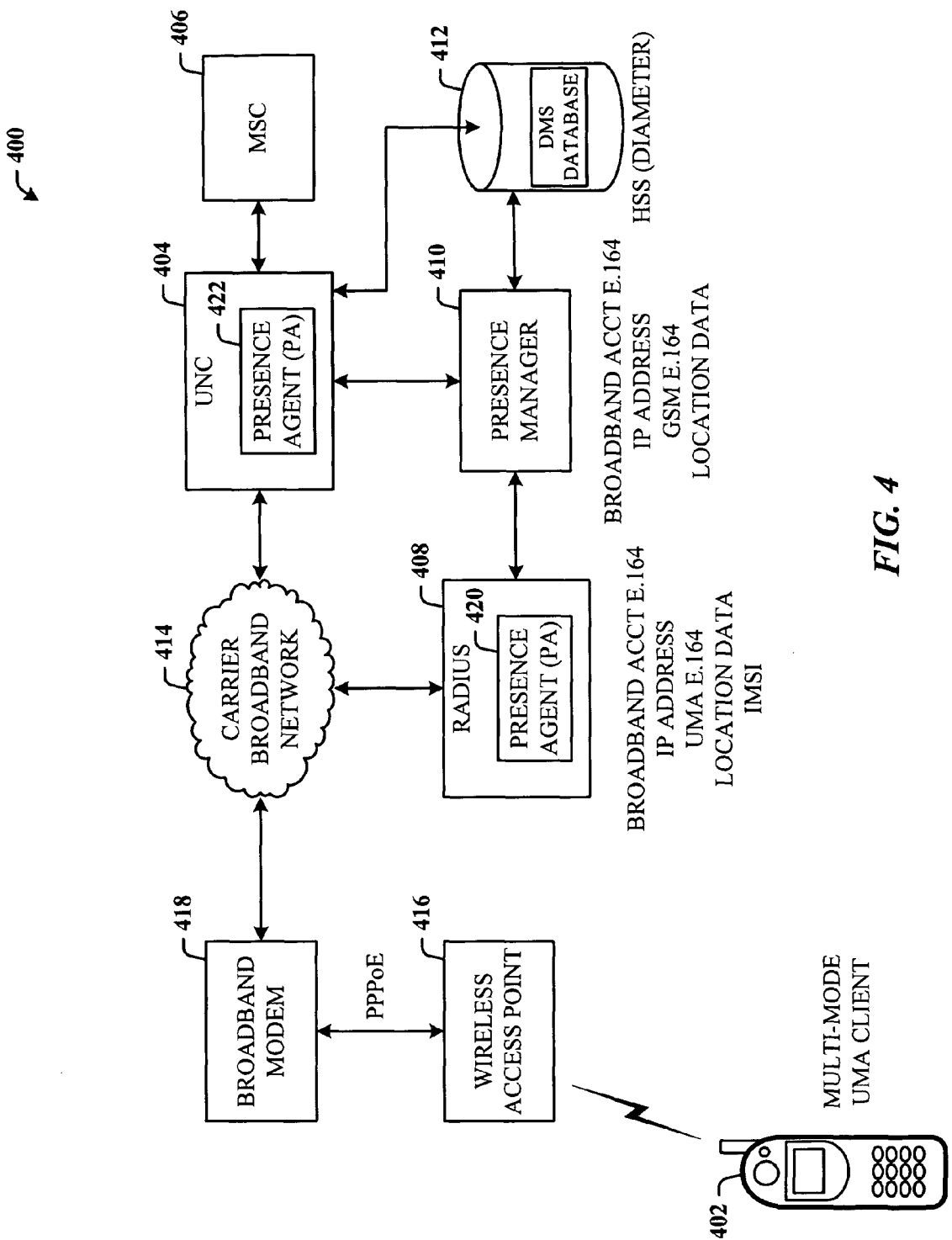
FIG. 4 illustrates a more detailed system that provides network access control of a UMA client in accordance with another aspect of the innovation.

FIG. 4 illustrates a more detailed system 400 that provides network access control of a UMA client 402 in accordance with another aspect of the innovation. In the UMA architecture, at least the following elements exist: the UMA client in the handset 402, a UNC 404 that provides the interface to the core network via 3GPP specified A/Gb interfaces, an MSC (mobile switching center) 406, a RADIUS server 408, a presence manager (PM) 410 and a HSS (home subscriber server) 412.

Conventionally, the UMA handset 402 communicates over an unlicensed wireless network (e.g., WiFi, Bluetooth, . . . ) to an IP access network 414 (e.g., broadband DSL) to the UNC 404 to be authenticated and authorized for access to core network GSM voice and/or GPRS data services. If approved, the subscriber's current location information stored in the core network is updated, and all mobile voice and data traffic is routed to the UMA handset 402 over the UMA network (UMAN), instead of the radio access network.

In one implementation, the subject innovation adds novel functionality to the RADIUS server 408 in the form of a RADIUS presence agent 420 and/or to the UNC 404 in the form of a UNC presence agent 422 via a new database. The presence agents (420 and 422) facilitate communication of presence notification messages. The new database can be located anywhere, for example, in the HSS 412. The HSS 412 then functions at least like a new RADIUS server.

The DMS presence notification message can include a DSL account E.164 number, an IP address, a UMA E.164 number, IMSI (international mobile subscriber identity), and/or subscriber physical location information (e.g., street address, and the like). The IMSI is an ITU-T specification that uniquely identifies a subscriber to a mobile telephone service. The IMSI is used in a GSM network, and can be used in all cellular networks to identify at least the phone's home country and carrier. Once the presence and location information associated with this IP address is received, when the UMA client 402 registers on the UNC 408, the UNC will read the IMSI and the originating IP address. During the UMA registration procedure, the UMA client sends the following information to the UNC: the IMSI, the AP ID, and the originating IP address. The system can now go to the HSS 414 and do a search on the IP E.164 address and check to see if it is a valid IP address for this UMA client 402. If yes, then the system will validate the number and grant service. If the DMS is queried and a valid record is not returned, then the address originated from the IP address was one which was not authorized. The DSL carriers can assign specific discreet location information that corresponds to an IP address.

As described supra, a service-provider perspective is provided for controlling where a subscriber can use WiFi to access DMS. The service-provider perspective builds upon existing UMA and broadband security procedures to enable the UNC-SGW to validate the originating IP address of the UMA client. Solutions include the use of the physical location of the broadband endpoint to control DMS access, provide dynamic location based billing, and dynamically comply with E911 regulations. Although the subject description focuses on the DSL broadband network, the same concept can be applied to non-DSL networks such as cable modem networks, T1/E1, FTTH, etc.

Carriers can now charge differently for converged services depending on where the subscriber is located. For example, if the subscriber uses the parent's DSL service in the home, the call is free. If the subscriber uses a WiFi hotspot at local retail store, the call can be charged at the normal GSM rates, or differently than in the subscriber home.

Figure 5:
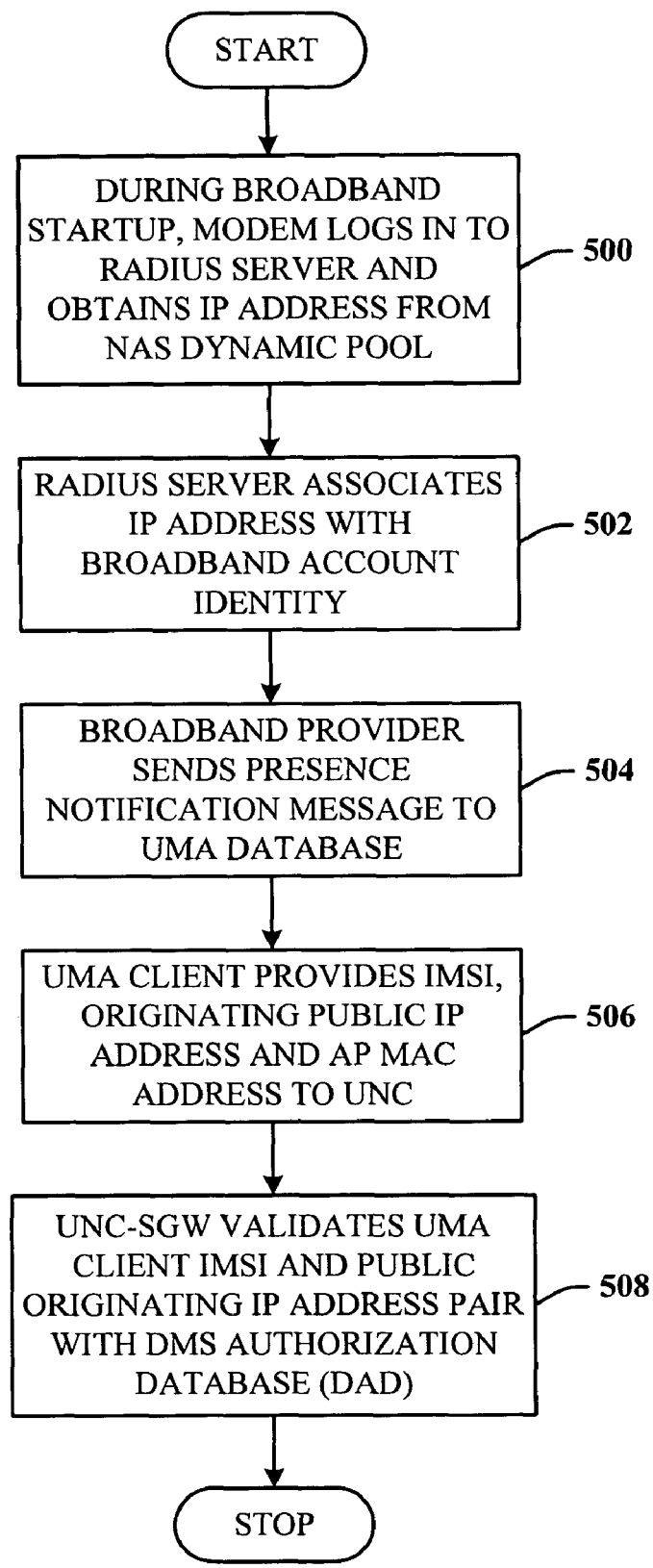
FIG. 5 illustrates a methodology of authenticating by validating a physical endpoint of the subscriber broadband connection and associating the subscriber to an IP address.

FIG. 5 illustrates a methodology of authenticating by validating a physical endpoint of the subscriber broadband connection and associating the subscriber to an IP address. At 500, during the broadband startup procedure (e.g., the PPPoE initiation procedure), the broadband modem will login and obtain an IP address from the Network Access Server's dynamic address pool. For example, as part of the access procedure the RADIUS server will associate the assigned IP address with the broadband account identity (e.g., the POTS (plain old telephone system) E.164 number). At 502, after associating the IP address with the broadband account identity, the broadband service provider sends a presence notification message to a new DMS subscriber authorization database (DAD), as indicated at 504. The presence notification message can include information used by the UNC-SGW to authorize the UMA client to use the broadband connection based on the broadband account identity and IMSI parameter. At 506, during the registration procedure, the UMA client provides the IMSI, originating public IP address, and the MAC address of the access point. At 508, the UNC-SGW validates the UMA client's IMSI and public originating IP address pair with the DAD.

The DAD is a virtual element that can reside in the UMAN, and can be part of a larger subscriber database such as the HLR (Home Location Register), HSS (Home Subscriber Server), AAA server, or carrier-specific database. Key functions of the DAD include receiving presence notification messages from broadband service providers, correlating the broadband account identity and public IP address with the UMA subscriber's IMSI and with the current IMSI and IP address, and accepting or rejecting authorization requests from the UNC-SGW based on the UMA client IMSI and originating public IP address.

The DAD can be provisioned with an appropriate information record for each authorized broadband identity. FIG. 6A and 6B illustrate examples of record formats 600 and 602 that can be employed. A first record format 600 can include the following information.

| Field Name | Description |
| --- | --- |
| IMSI | International Mobile Subscriber Identity |
| IP Address | Public originating IP address of the subscriber's broadband CPE (customer premise equipment) |
| Broadband Identity | The account number to identify the subscription owner, can be the same as the POTS E.164 number. |
| Location | Optional field with physical location information of the broadband endpoint. May be the street address or geo coordinates used for E911 location information. |

A second record format 602 can include the following information. Thus, the database record can include the IMSI and the E.164 number.

| Field Name | Description |
| --- | --- |
| IMSI | International Mobile Subscriber Identity |
| IP Address | Public originating IP address of the subscriber's broadband CPE |
| Broadband Identity | The account number to identify the subscription owner, can be the same as the POTS E.164 number. |
| Location Billing Code | Optional field used by the UNC to determine the appropriate CGI (cell global identity) value to be used in the CDR (call detail record). |
| Location Address | Optional field with physical address information of the broadband endpoint. |
| Location Geo Coordinates | Optional field with lat/long of the endpoint used for E911 compliance. |

The broadband service provider's security and access control procedures can be provisioned with one or more IMSIs authorized to use the broadband connection.

The UNC registration procedure can include the following MS (mobile station) and AP (access point) addressing parameters (as provided by the UMA specification UMA Stage 2):

The IMSI associated with the SIM in the terminal. This identifier is provided by the MS to the UNC when it registers to a UNC. The UNC maintains a record for each registered MS. For example, the IMSI is used by the UNC to find the appropriate MS record when the UNC receives a BSSMAP (base station system management application part) PAGING message. The BSSMAP protocol is also used to convey general BSS (base station system) control information between an MSC (mobile switching center) and the BSS. An example is the allocation of traffic channels between the MSC and the BSS.

Public IP address of the MS. The public IP address of the MS is the source IP present in the outermost IP header of packets received from the MS by the UNC-SGW. If available, this identifier may be used by the UNC to support locations services and fraud detection. It may also be used by service providers to signal managed IP networks IP flows that require QoS (quality of service) treatment.

The Access Point (AP) ID. The AP-ID is the MAC address of the unlicensed mode access point through which the MS is accessing UMA service. This identifier is provided by the MS (obtained via broadcast from the AP) to the UNC via the Up interface, when it requests UMA service. The AP-ID may be used by the UNC to support location services. The AP-ID may also be used by the service provider to restrict UMA service access via only authorized APs.

Figure 7:
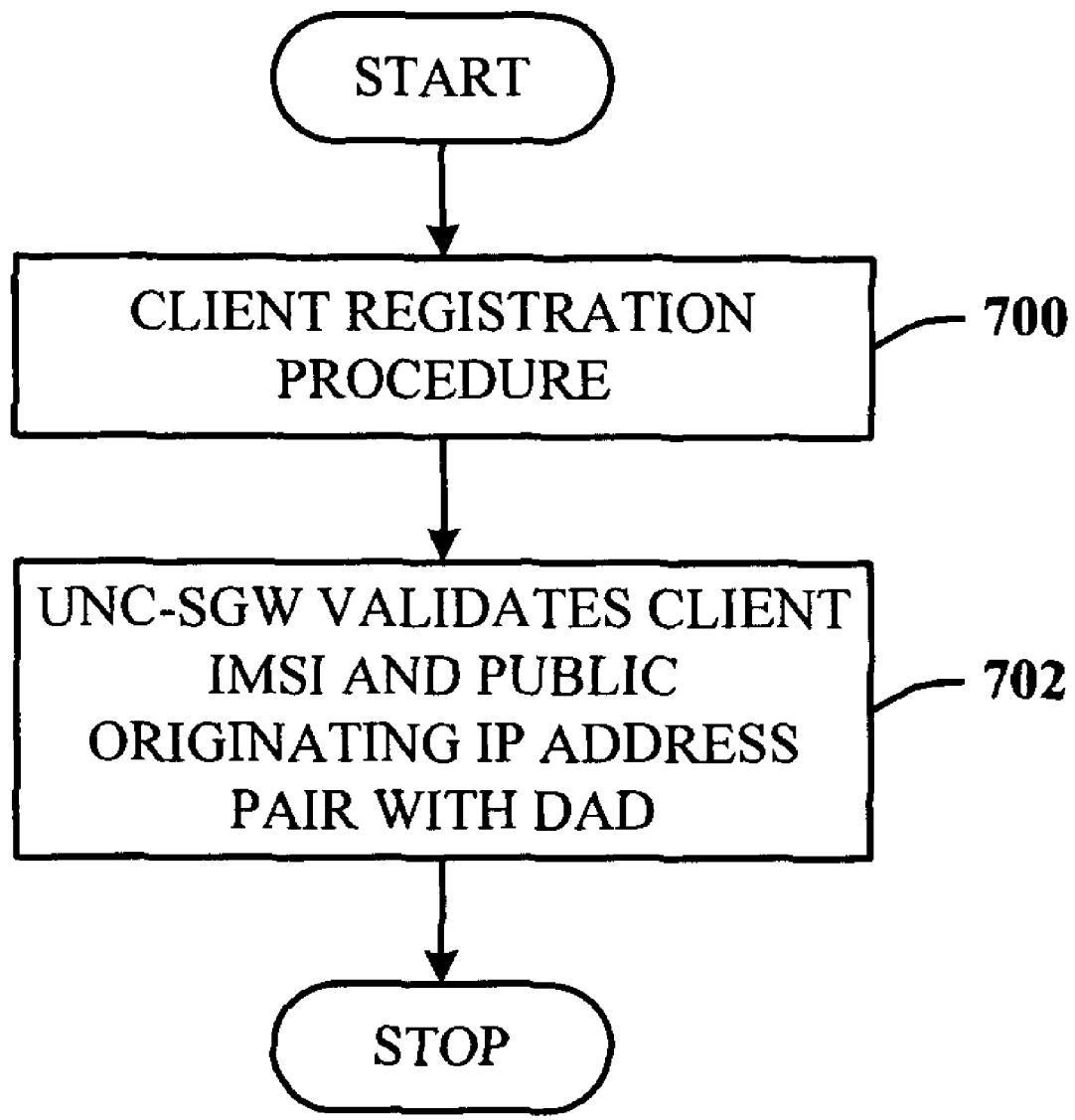
FIG. 7 illustrates a client registration procedure.

FIG. 7 illustrates a client registration procedure. At 700, a client registration procedure is initiated. At 702, the UNC-SGW validates the client IMSI and originating public IP address against the DAD.

Figure 8:
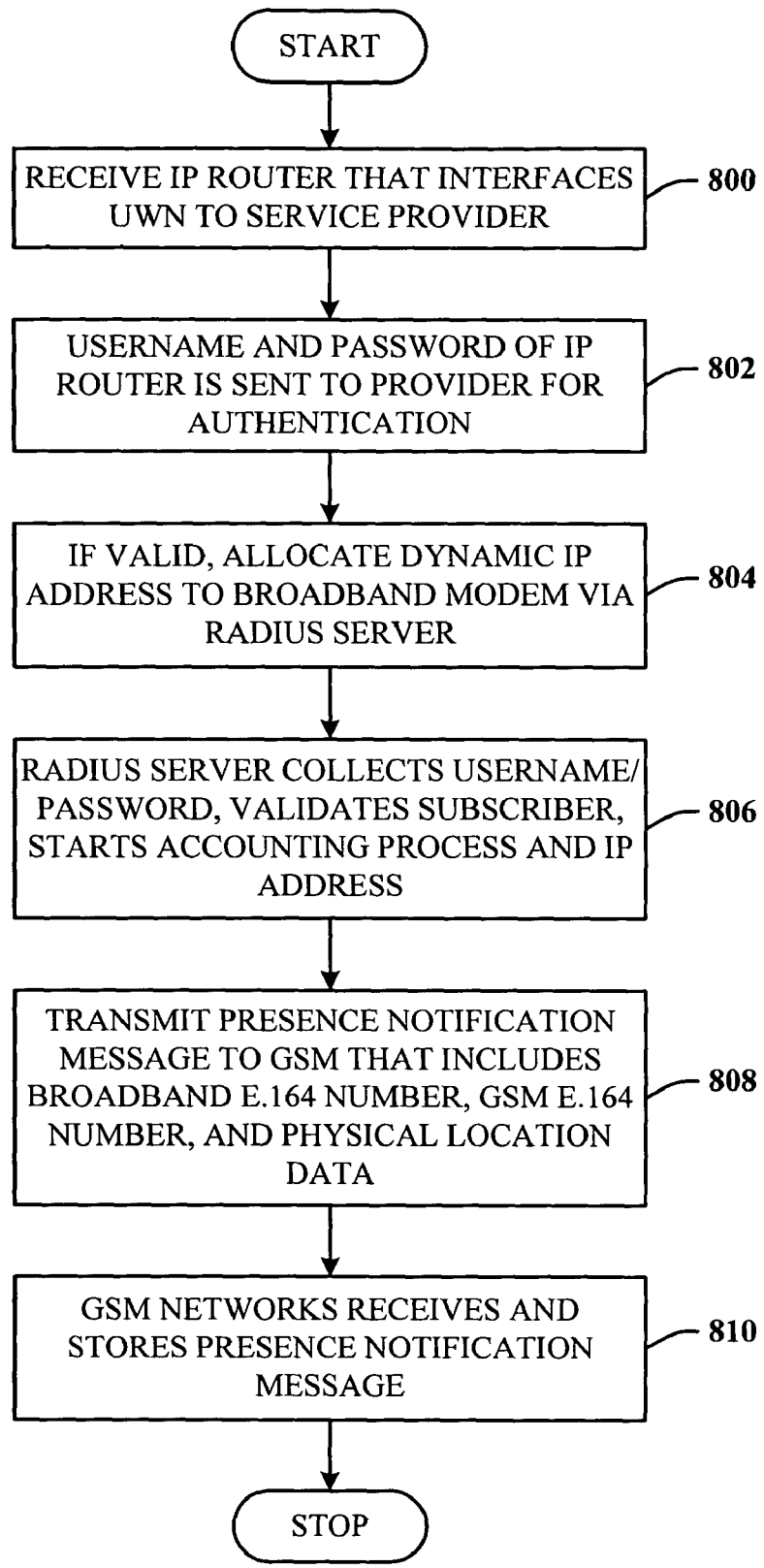
FIG. 8 illustrates a methodology of identifying and validating a physical location of a broadband customer endpoint that is authorized to allow UMA service.

FIG. 8 illustrates a methodology of identifying and validating a physical location of a broadband customer endpoint that is authorized to allow UMA service. At 800, an IP router is received that interfaces the UWN to the broadband service provider through the broadband modem. On the IP router, the subscriber username and password is entered, which information is sent to the broadband service provider (e.g., DSL provider), for authentication via a RADIUS server, as indicated at 802. At 804, the provider then authenticates that username and password as being a valid subscriber, and enables service. At that time, the provider allocates a dynamic IP address (or static IP address) that will be assigned and accepted by the broadband modem. This is handled by the RADIUS server in the broadband network. At 806, the RADIUS server collects the username/password, validates the subscriber, and starts the accounting process, and knows the IP address of the subscriber and that the particular subscriber has network access.

In accordance with the subject invention, functionality is added to take the information it has collected during the subscriber login and create the presence message that will be transmitted over to the GSM network. Accordingly, at 808, a presence notification message is sent that includes the broadband E.164 number, a GSM E.164 number, and the physical location data (street address, etc.). At 810, this data gets sent over to a standard presence interface on the GSM network, which GSM network accepts it, and stores it into a database.

Figure 9:
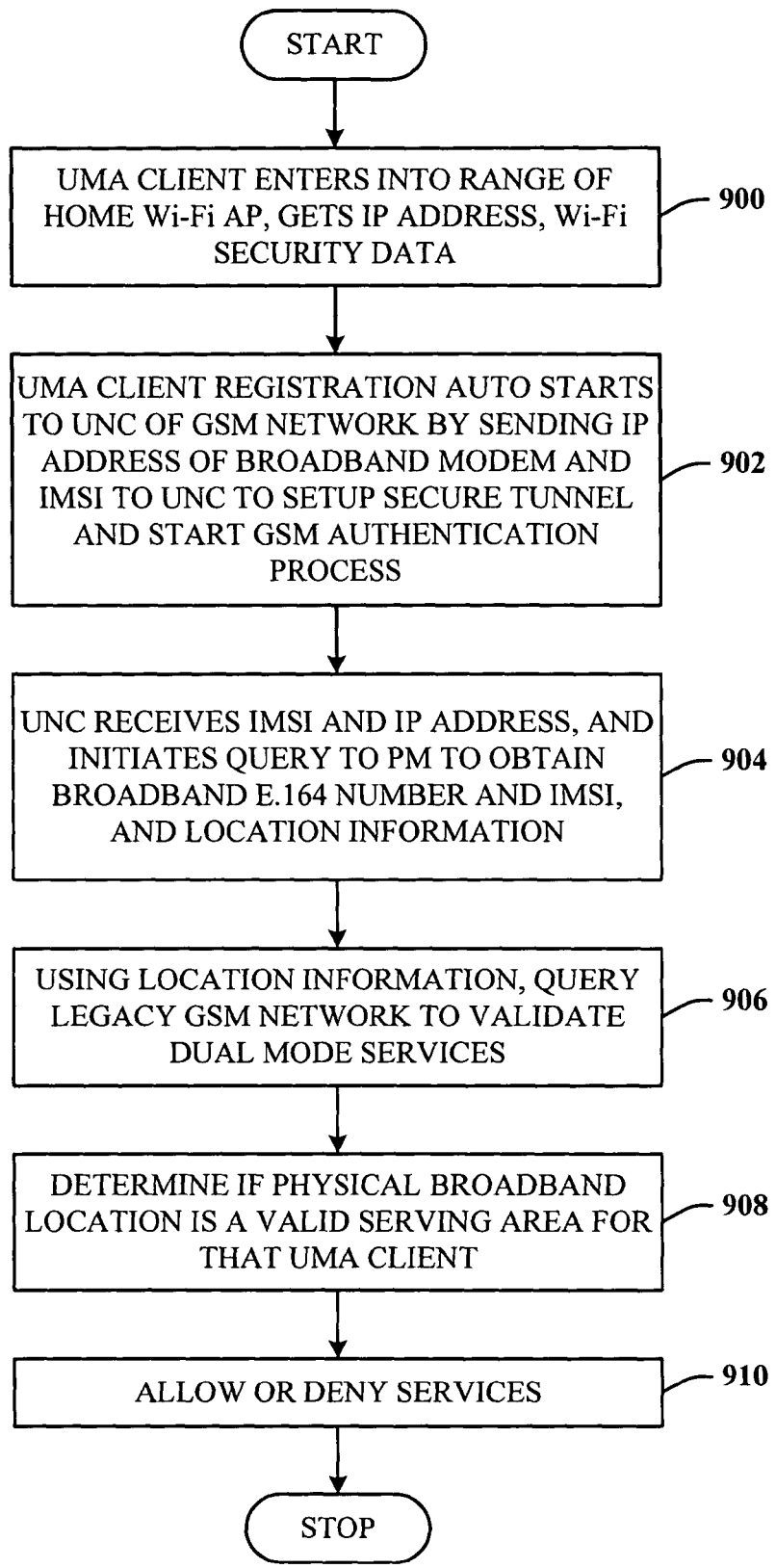
FIG. 9 illustrates a methodology of correlating a broadband physical location with the originating IP address of the UMA client and subsequently allow or deny UMA service.

Referring now to FIG. 9, there is illustrated a methodology of correlating a broadband physical location with the originating IP address of the UMA client and subsequently allow or deny UMA service. At 900, the UMA client enters into the home, detects the WiFi network and, receives an IP address and WiFi security data. At 902, a UMA client registration procedure is automatically started back to the UNC on the GSM network. The registration process includes sending the IP address of the broadband modem and the IMSI to the UNC to setup the secure tunnel and start the standard GSM authentication procedures.

In accordance with added novel functionality of the UNC, once the UNC collects the IMSI and IP address, the UNC initiates a query to the database (e.g., the HSS DIAMETER database) to get the E.164 DSL number, and the IMSI, as indicated at 904. At 906, using the location information, the UNC collects that information and goes back to the legacy GSM network and queries the network to validate the dual mode services. At 908, a determination is made whether the broadband physical location is one of the valid serving areas for that particular UMA client. At 910, in accordance with the determination, service is then allowed or denied.

Figure 10:
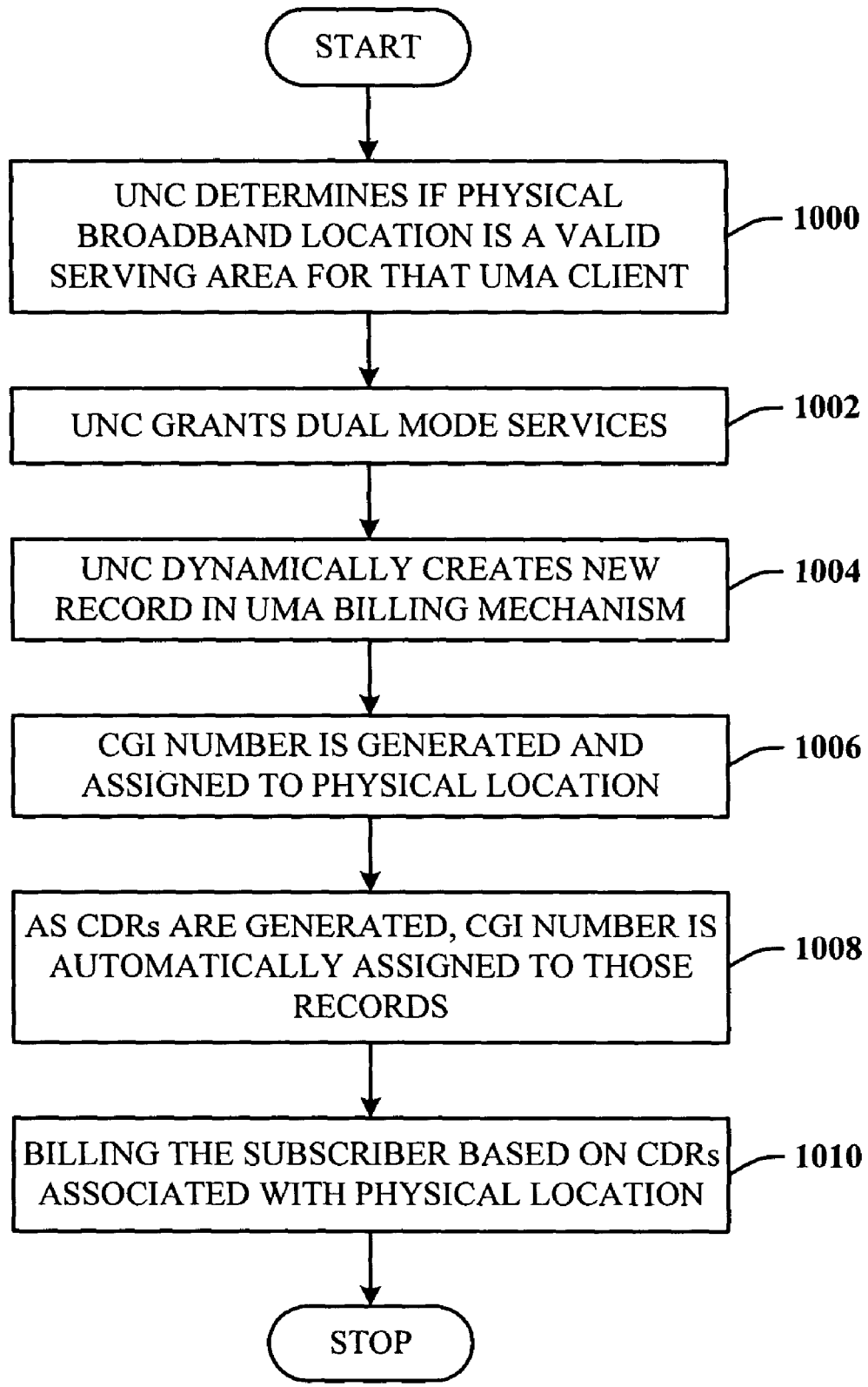
FIG. 10 illustrates a methodology of dynamically assigning a cell global identity to specific IEEE 802.11 access points during the UMA client registration procedure for the purpose of providing location-based billing.

FIG. 10 illustrates a methodology of dynamically assigning a cell global identity to specific IEEE 802.11 access points during the UMA client registration procedure for the purpose of providing location-based billing. The UNC has the capability to generate signaling to the MSC, which will generate a CDR (call detail record), which will have a cell global identity (CGI), and that consists of the location area identity plus cell ID. In accordance with novel functionality added to the UNC, at 1000, the UNC determines if the physical location is a valid serving area for the UMA client. At 1002, when the UNC validates and determines that that particular physical location is valid for that UMA client, it grants dual-mode services. At 1004, the UNC dynamically creates a new record in the UMA billing mechanism. At 1006, a CGI number is generated and assigned for that physical location. At 1008, as the UNC generates CDRs, a dynamically created CGI is applied for those particular call records. Almost all new functionality is provided in UNC via the presence agent. There can also be functionality added to the RADIUS server for the broadband component via a RADIUS presence agent. At 1010, the subscriber can then be billed according to the CDRs that were generated in association with the physical location.

Figure 11:
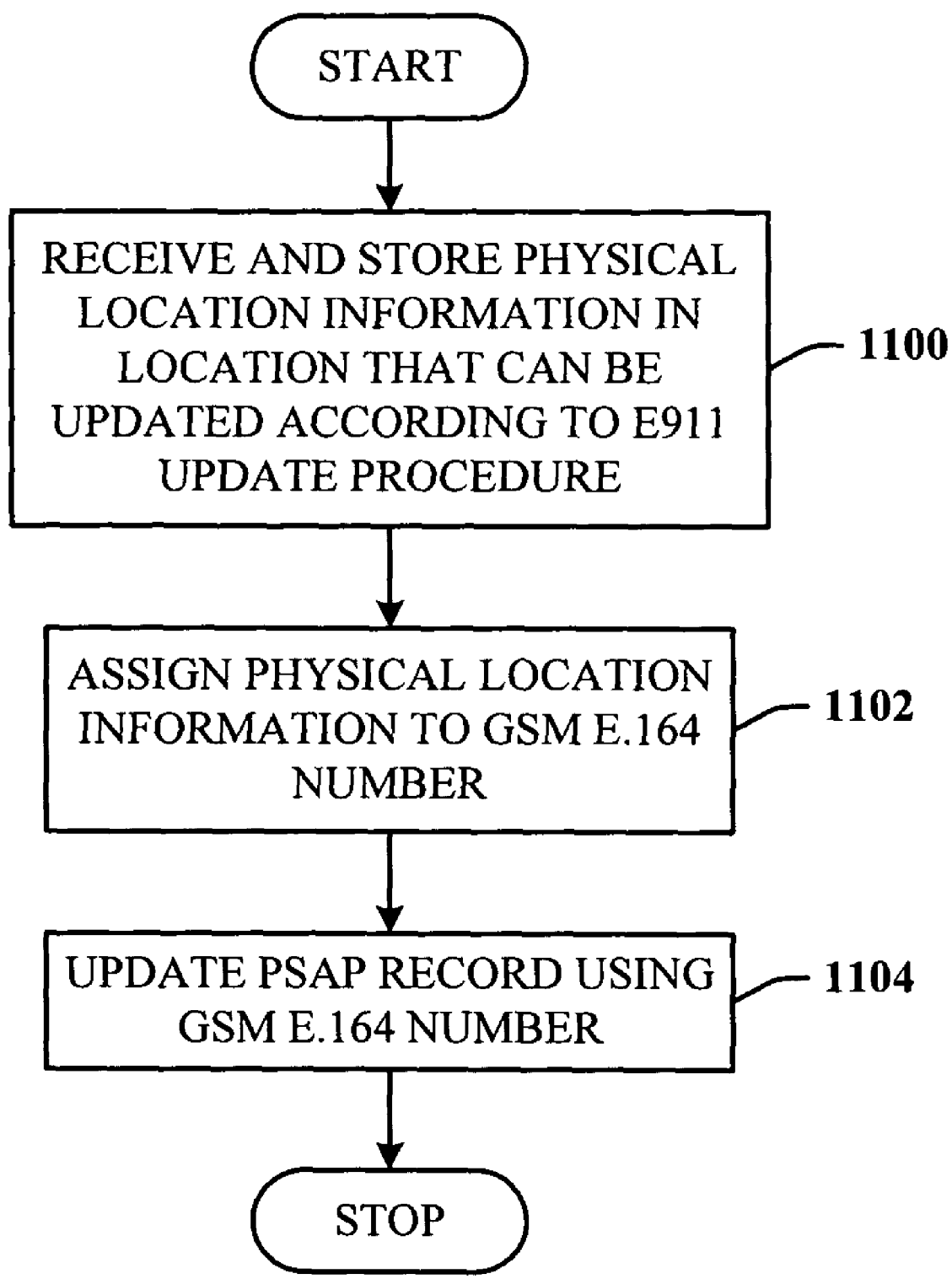
FIG. 11 illustrates a methodology of dynamically assigning physical location information to UMA client sessions for the purpose of E911 compliance.

Referring now to FIG. 11, there is illustrated a methodology of dynamically assigning physical location information to UMA client sessions for the purpose of E911 compliance. At 1100, the physical location information is collected and stored in a database. This database can reside in the UNC, and/or in the HSS where there is a notification sent that triggers an E911 database update procedure or in both the UNC and the HSS, for example. At 1102, the physical location information is then assigned to that particular GSM E.164 number. At 1104, the GSM E.164 number can be used to update a PSAP (public safety answering point) database with physical location data for that E.164 number. The PSAP is the first contact an E911 caller will get. The PSAP operator verifies or obtains the caller's whereabouts (location information), determines the nature of the emergency and decides which emergency response teams to notify.

Figure 12:
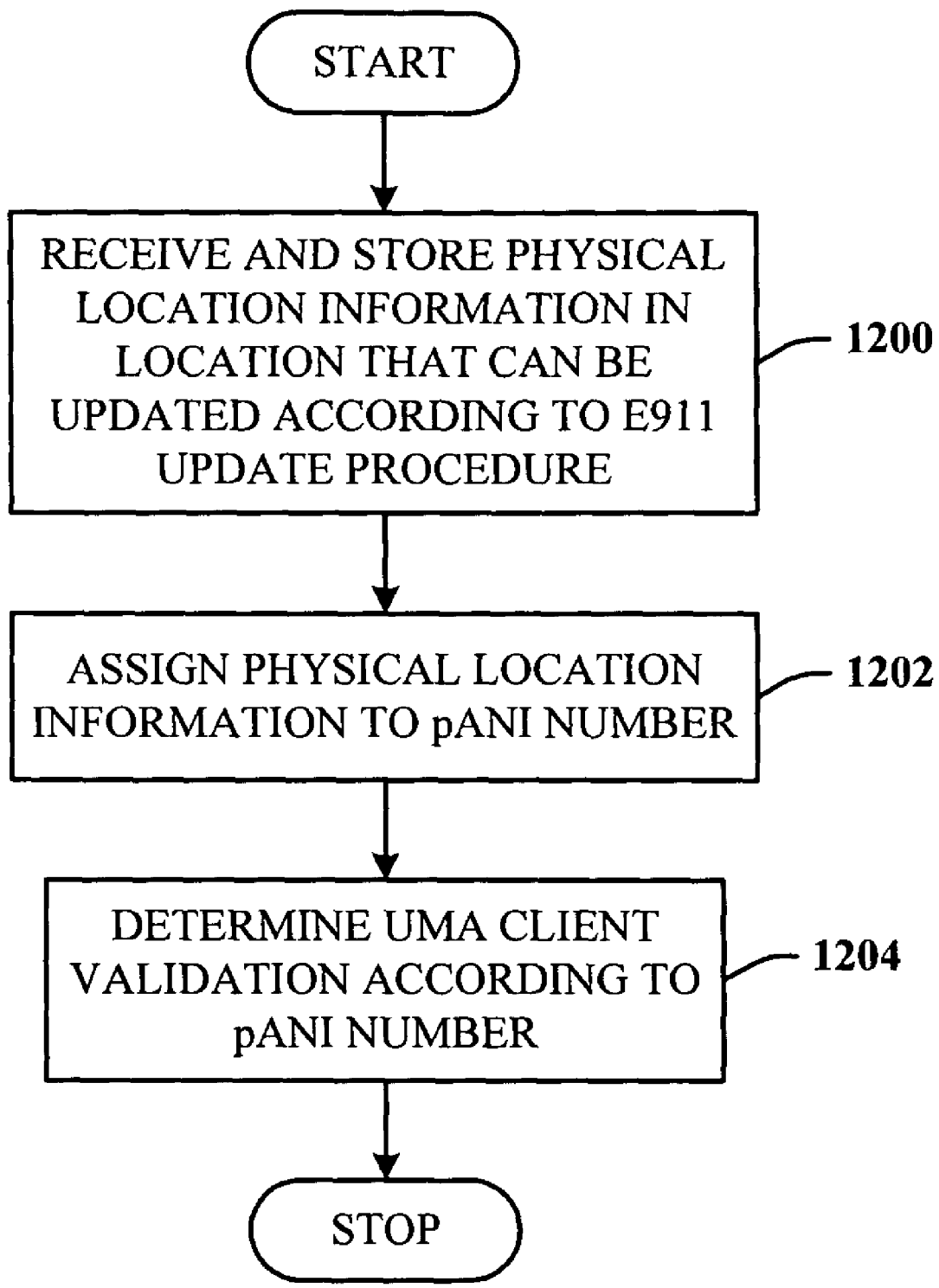
FIG. 12 illustrates an alternative methodology of dynamically assigning physical location information to UMA client sessions for the purpose of E911 compliance.

FIG. 12 illustrates an alternative methodology of dynamically assigning physical location information to UMA client sessions for the purpose of E911 compliance. At 1200, the physical location information is collected and stored in a database. This database can reside in the UNC, and/or in the HSS where there is a notification sent that triggers an E911 database update procedure or in both the UNC and the HSS, for example. Alternatively, at 1202, the physical location can be assigned as a pANI (pseudo automatic number identification) for the base transceiver station (BTS) towers. The pANI is a modification of the ANI, and is used to pass information across systems that can handle ANI traffic. The pANI is a number employed in wireless E911 call setup that can be used to route the call the appropriate PSAP. The pANI generally identifies the cell/sector from which the call was made, whereas the ANI carries the actual telephone number of the wireline caller. Thus, at 1204, an E911 call center can obtain the telephone number and a general location of the caller based on the pANI number. In one implementation, a pseudo telephone number is created and assigned to a BTS tower, a cell sector, and stored in a PSAP database.

Figure 13:
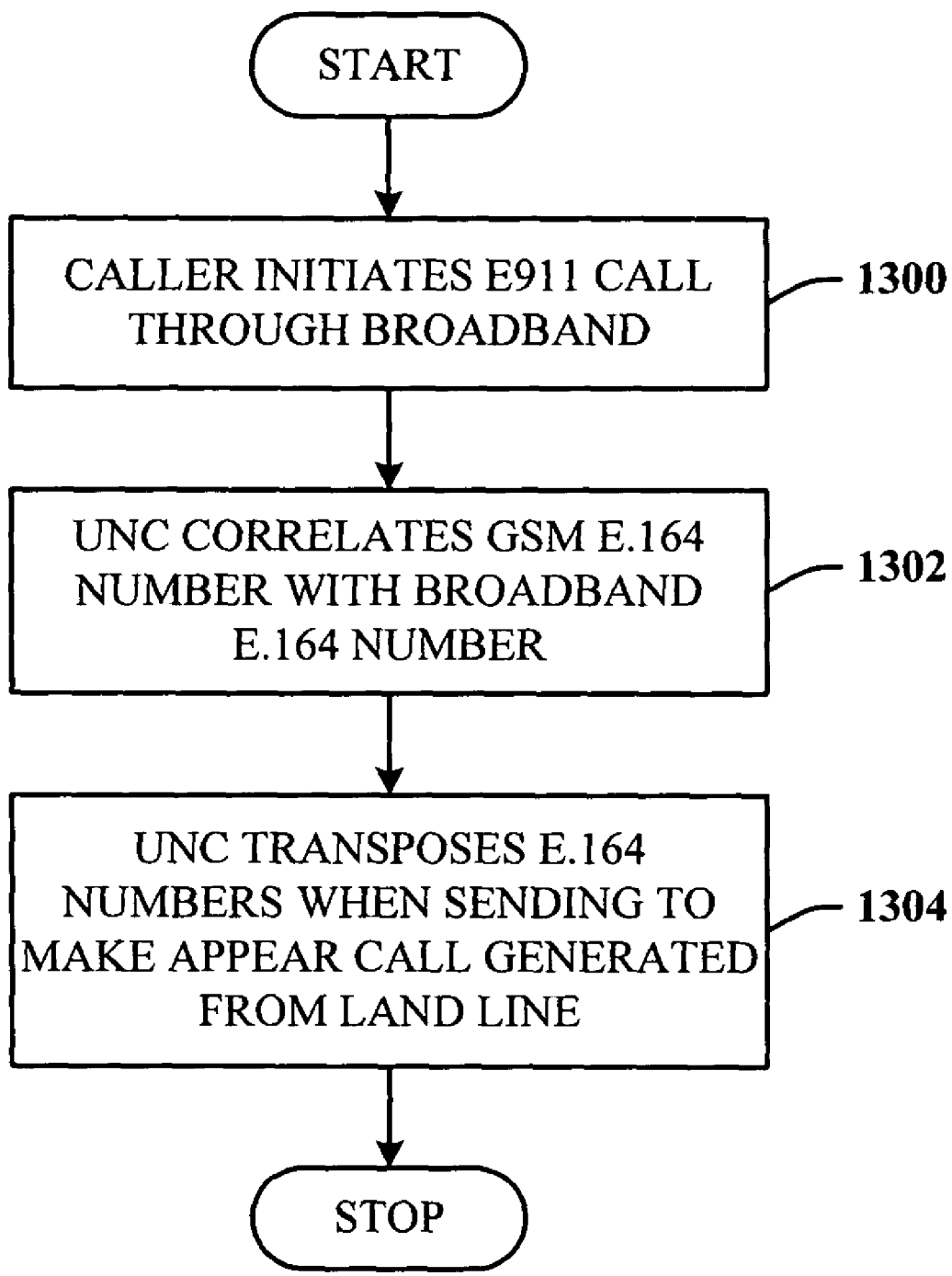
FIG. 13 illustrates yet another alternative methodology of dynamically assigning physical location information to UMA client sessions for the purpose of E911 compliance.

FIG. 13 illustrates yet another alternative methodology of dynamically assigning physical location information to UMA client sessions for the purpose of E911 compliance. At 1300, the caller initiates an E911 call through the broadband network. At 1302, the UNC correlates the GSM E.164 number with the broadband E.164 number (e.g., DSL E.164 number). At 1304, the UNC transposes the E.164 numbers when sending the digits to the selected tandem. That way, the UNC makes it appear as though the call is originating from a land line. The broadband E.164 number will already have that physical street address for that telephone number.

Figure 14:
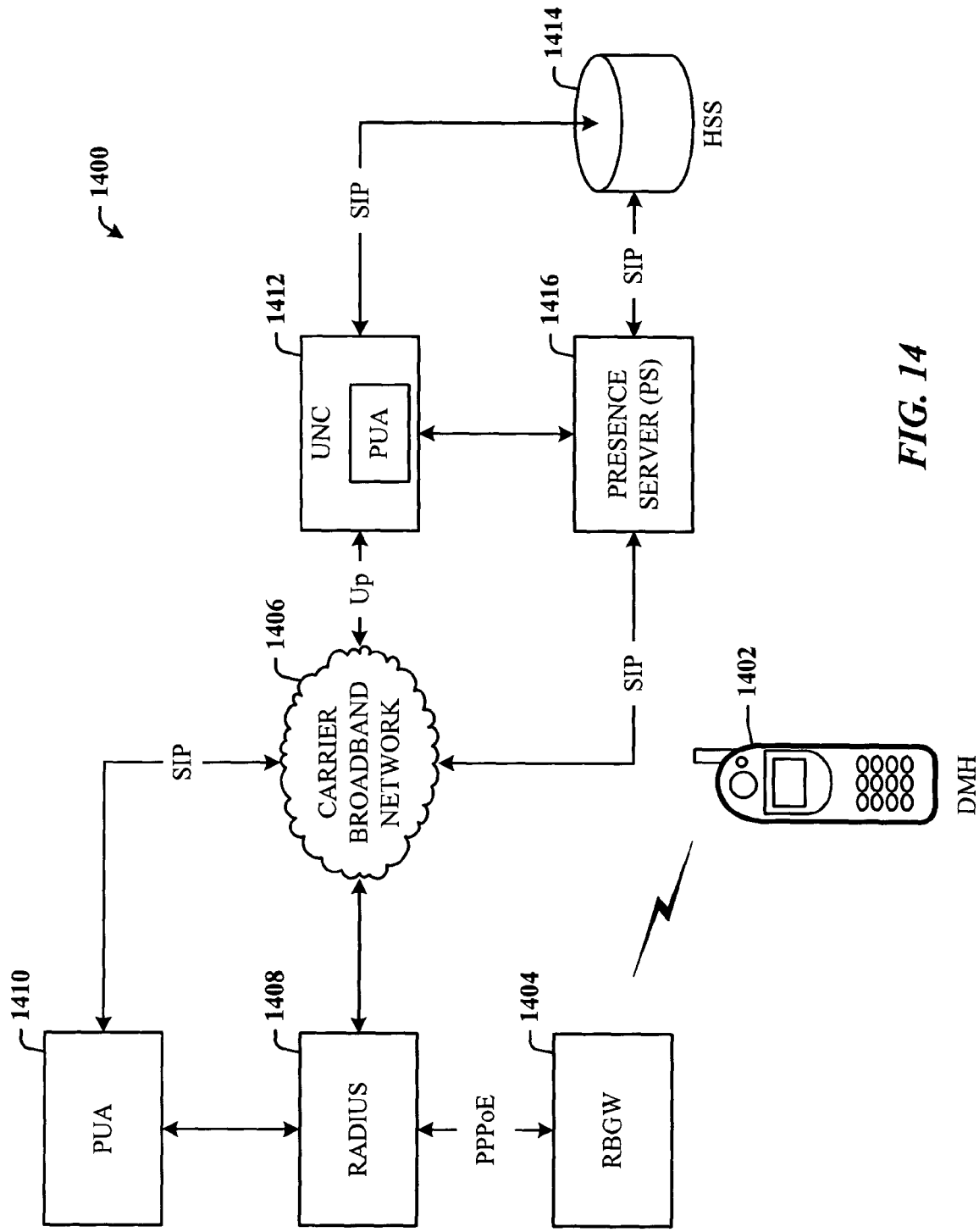
FIG. 14 illustrates another exemplary architecture according to one innovative aspect.

FIG. 14 illustrates another exemplary architecture 1400 according to one innovative aspect. For the purpose of illustrating this Dynamic DMS Access Control concept, a dual mode handset (DMH) 1402 is provided, which can be a UMA handset. However, it is within contemplation that IMS VoIP handsets can also be supported. The innovation has zero impact on the DMH and reuses the IMSI and originating IP address during the UMA registration procedure.

The wireless handset 1402 communicates with an RBGW 1404. This element 1404 can include any or all of a broadband modem (in this case a DSL modem), an IP router, a WiFi access point, and analog terminal adapters. The RBGW 1404 uses the PPPoE protocol for IP access to a broadband network 1406. The RBGW interfaces to a RADIUS (remote authentication dial-in user service) 1408, which authenticates the RBGW, authorizes service, and assigns an IP address, for example.

A presence user agent (PUA) 1410 interfaces to the RADIUS server 1408 and the broadband network 1406. The PUA 1410 provides functionality to notify the 3GPP network of the physical attributes (e.g., identity, IP address, and location) of the broadband endpoint.

A UNC 1412 interfaces to the broadband network 1406 and includes the SGW that authenticates and authorizes service to the DMH client 1402 (e.g., UMA). A new function (a presence user agent) in the UNC is introduced that queries an HSS 1414 to validate broadband endpoints during the UMA registration procedure. A presence server 1416 is provided that receives presence information from the PUA 1410 and updates the subscriber record in the HSS 1414. The HSS 1414 is part of the IMS core used for subscriber provisioning and stores profiles. A new schema is introduced to support the correlation of broadband identities and IP addresses with IMSI data. This concept assumes the HSS includes the DAD.

Following are two message flows that impact the broadband link activation and UMA client registration procedures. For simplicity, not all messaging procedures are shown and some procedures may be simplified. The RADIUS element is assumed to include the network access server and aggregator functions.

Figure 15:
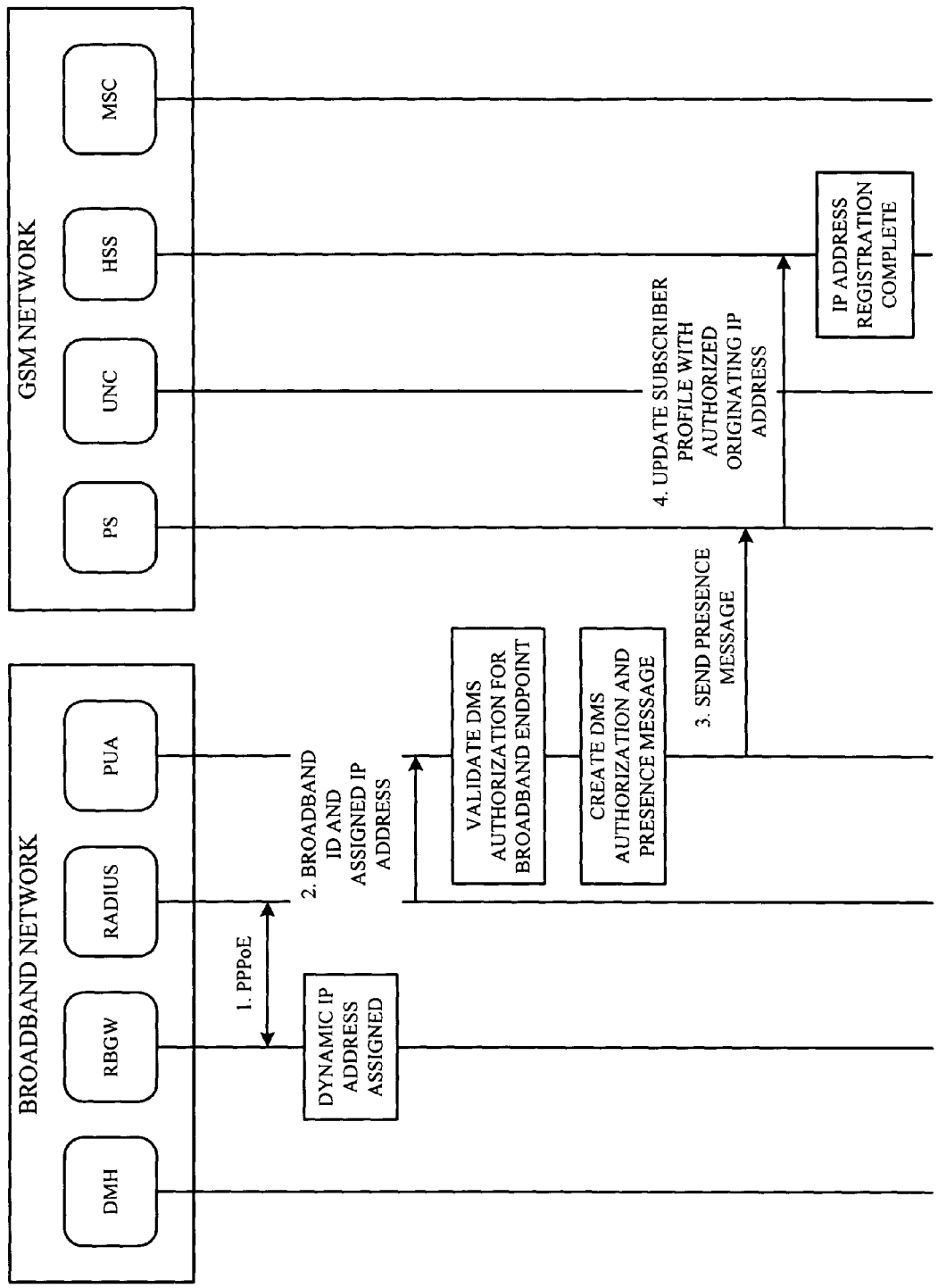
FIG. 15 illustrates a message flow for an IP registration procedure.

FIG. 15 illustrates a message flow for an IP registration procedure. A PPPoE session is started and established between the RBGW and RADIUS node. This process authenticates the RBGW, initiates a PPP session, assigns an IP address, and starts accounting. A result is that an IP address is assigned to the RBGW (e.g., a DSL modem). The RADIUS node then notifies the PUA of the broadband service identity, typically the POTS E.164 number, and the IP address assigned to the RBGW. This notification triggers the PUA to query the broadband subscriber database (not shown) to determine if the broadband identity is allowed to support DMS. If DMS is allowed, the PUA collects the endpoint location information from the broadband subscriber database. A result is that DMS authorization is validated for the broadband endpoint. Another result is that a DMS authorization and presence message is created. The PUA then sends the DMS authorization and presence message to the presence server. This notification triggers the presence server to initiate a subscriber profile update in the DAD, here located in the HSS. The presence server updates the subscriber's record in the DAD, in this case the HSS, with the originating IP address of the authorized broadband endpoint. The UNC uses this information during the UMA registration procedure. At this point, IP address registration is complete.

Figure 16:
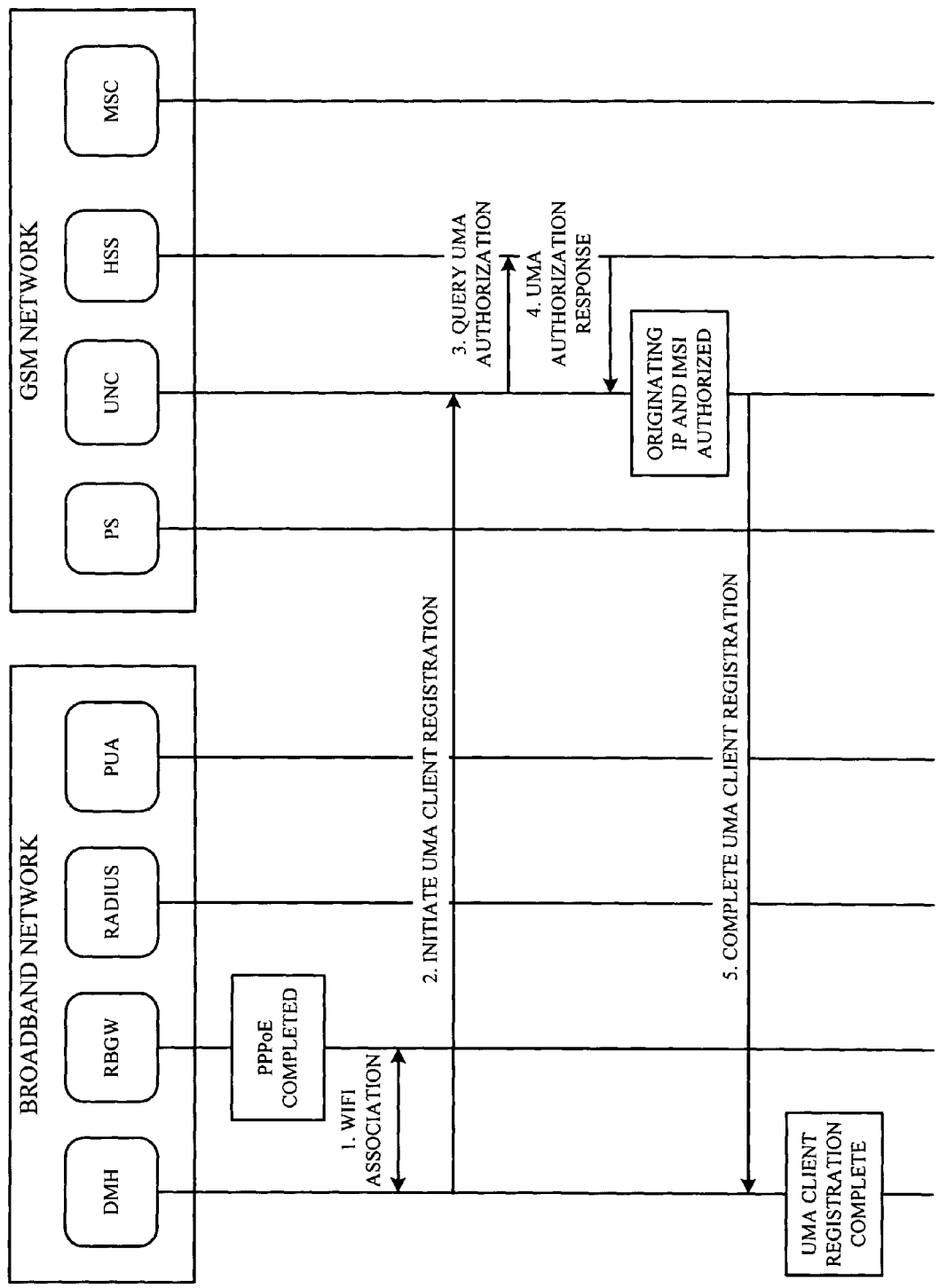
FIG. 16 illustrates message flow for a UMA registration and authorization procedure.

FIG. 16 illustrates message flow for a UMA registration and authorization procedure. Initially, a PPPoE is session is active to the RBGW. The DMH initiates and completes a WiFi association process that includes the IEEE 802.11 security. The DMH initiates the UMA registration procedure with the UNC. The UNC identifies the IMSI and originating IP address in the registration message and IP packets. The UNC queries the HSS for the IMSI and originating IP address. If found, the UNC allows DMS access for this broadband endpoint. If not, access is denied. A result is that the originating IP address and IMSI are authorized. The UMA client and UNC complete the UMA registration process including SIM Authentication (not shown) and an IPsec tunnel. The UMA client registration is then complete.

In a scenario of multiple access points served by a single, public originating IP address, and because the UMA client can include the access point MAC address during the UMA registration procedure, a combination of originating IP address and access point MAC address can be used to identify UMA caller's E911 location.

With respect to a broadband provider, the subject innovation can envision that a static IP address is required to support E911 for enterprise environments that use a single, public originating IP address to serve multiple WiFi access points in multiple locations. However, dynamic IP addressing can also be used to support the enterprise.

A broadband provider concept envisions a self-provisioning mechanism whereby the subscriber and/or DMS provider can be allowed to update a broadband account profile to set DMS permissions for the broadband endpoint. With regards to provisioning, each broadband account can be provisioned to allow or deny the self-provisioning of DMS-allowed IMSI (s). The broadband subscriber controls which DMS E.164 (or IMSIs) are allowed to use his or her broadband service. Each broadband account can be self-provisioned by the subscriber or other mechanism with one or more IMSIs that are allowed DMS from this endpoint. One method may be for the DMS provider to update the broadband account with a list of authorized IMSIs. The broadband provider can enable a PPPoE access concentrator to trigger the appropriate presence notification to the DAD via the PUA.

With respect to a DMS provider, the innovation can assume that no additional per subscriber provisioning is required. The DAD can use the IMSI as the key field. The DAD can be dynamically provisioned as part of the standard DMS provisioning process. A presence server can be employed to receive notifications from the broadband provider PUA and update the DAD. The DMS authentication and access control element (in this case the UNC-SGW) can query the DAD during the DMS registration procedure to allow or deny DMS based on the DMH IMSI and originating IP address.

E911 call handling and database procedures require the DMS provider to identify the appropriate PSAP via the E911 tandem or selective router. The DMS provider associates the location of the broadband endpoint with the appropriate PSAP. The DMS provider may update an automatic location information (ALI) database with the current information of the DMS E.164 number. The DMS Provider can enable the DMS E911 call to masquerade as a fixed wireline call by replacing the DMS E.164 number's calling number (ANI) ID with the broadband E.164 number. This procedure puts DMS E911 calls on par with fixed wireline E911 calls. The DMS handset can provide a visual indicator to inform the subscriber of his or her E911 location status (e.g., good, unavailable, other). The DMS provider can provide an E911 location update to the DMS handset and expose this information to the subscriber.

The enterprise is responsible for updating (e.g., mechanized and/or via the broadband provider) the DAD with the current and accurate location information for access points in the enterprise. In a scenario where a static IP and/or address space is assigned to a physical endpoint, a manual process can be used to update the DAD. In a case where multiple access points are served by a single broadband endpoint, a manual process can be implemented to associate an access point MAC address with the physical endpoint location. See the following DAD record example for multiple access points.

| Field Name | Value |
| --- | --- |
| AP_MAC_ADDRESS | 00-05-9A-3C-78-00 |
| BROADBAND_ID | 404-555-1212 |
| AP_LOCATION | 5565 Glenridge Connector, 9$^{th}$ floor |

After the UNC queries the DAD and authorizes the originating IP address, a second query can be made to search for an access point record. If the access point is found and its BROADBAND_ID field matches the broadband record BROADBAND_ID field, the E911 location information is set to the AP_LOCATION value. This technique for supporting multiple access points can require new development to the PSAP and/or ALI.

Figure 17:
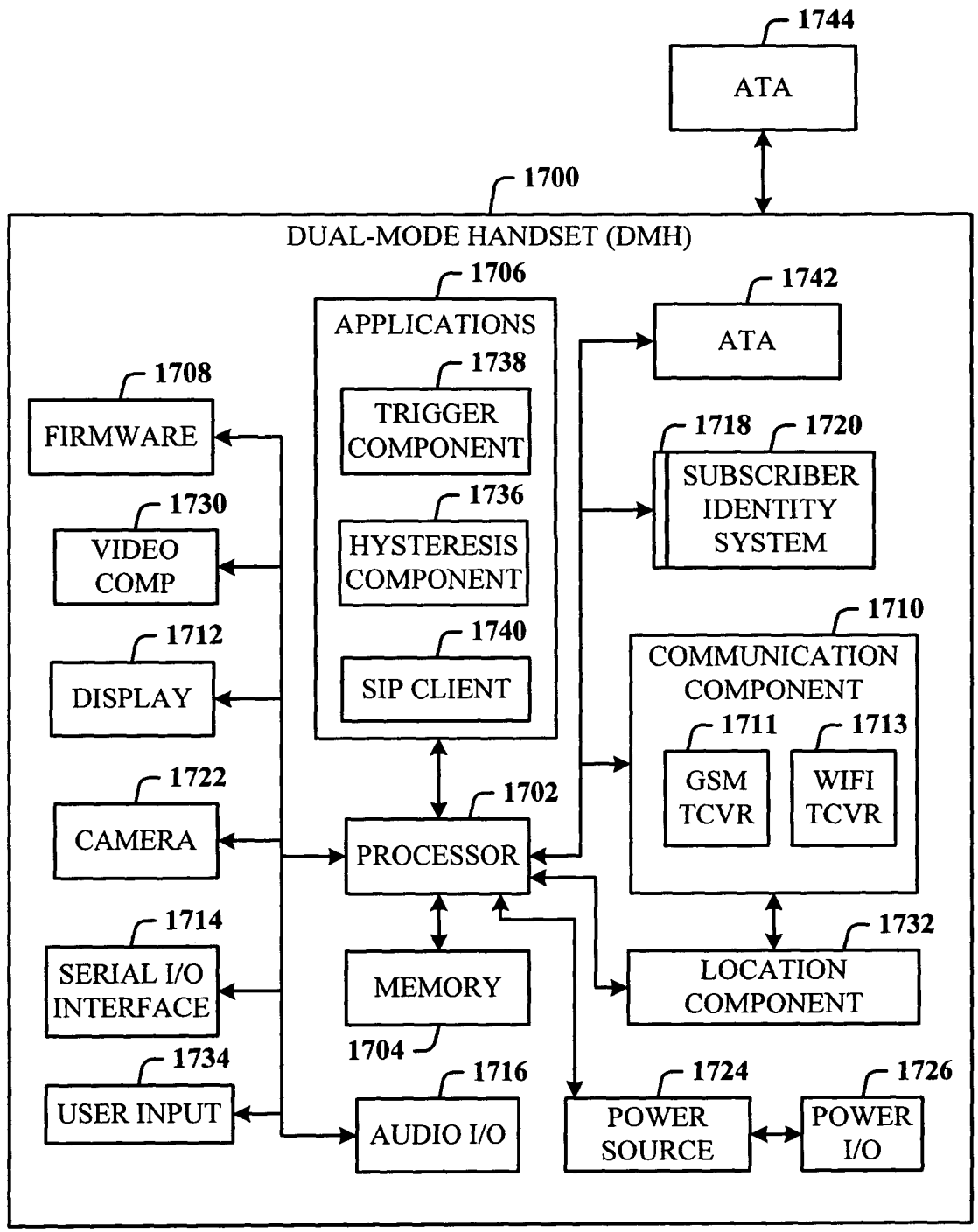
FIG. 17 illustrates a schematic block diagram of a dual-mode handset (DMH) in accordance with an innovative aspect.

FIG. 17 illustrates a schematic block diagram of a dual-mode handset (DMH) 1700 in accordance with an innovative aspect. In order to provide additional context for various aspects thereof, FIG. 17 and the following discussion are intended to provide a brief, general description of a suitable environment 1700 in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The DMH 1700 (similar to client handset 104, 402, 1402) includes a processor 1702 for controlling and processing all onboard operations and functions. A memory 1704 interfaces to the processor 1702 for storage of data and one or more applications 1706 (e.g., a video player software, user feedback component software, etc.). Other applications can include voice recognition of predetermined voice commands that facilitate initiation of the user feedback signal, as well as those described infra. The applications 1706 can be stored in the memory 1704 and/or in a firmware 1708, and executed by the processor 1702 from either or both the memory 1704 or/and the firmware 1708. The firmware 1708 can also store startup code for execution in initializing the DMH 1700. A communication component 1710 interfaces to the processor 1702 to facilitate wired/wireless communication with external systems, e.g., cellular networks, VoIP networks, and so on. Here, the communications component 1710 also includes a GSM transceiver 1711 and a WiFi transceiver 1713 for corresponding signal communications. The DMH 1700 can be a device such as a cellular telephone, a PDA with mobile communications capabilities, and messaging-centric devices.

The DMH 1700 includes a display 1712 for displaying text, images, video, telephony functions (e.g., a Caller ID function), setup functions, and for user input. The display 1712 can also accommodate the presentation of multimedia content. A serial I/O interface 1714 is provided in communication with the processor 1702 to facilitate wired and/or wireless serial communications (e.g., USB, and/or IEEE 1394) via a hardwire connection, and other serial input devices (e.g., a keyboard, keypad, and mouse). This supports updating and troubleshooting the DMH 1700, for example. Audio capabilities are provided with an audio I/O component 1716, which can include a speaker for the output of audio signals related to, for example, indication that the user pressed the proper key or key combination to initiate the user feedback signal. The audio I/O component 1716 also facilitates the input of audio signals via a microphone to record data and/or telephony voice data, and for inputting voice signals for telephone conversations.

The DMH 1700 can include a slot interface 1718 for accommodating a SIC (Subscriber Identity Component) in the form factor of a card Subscriber Identity Module (SIM) or universal SIM 1720, and interfacing the SIM card 1720 with the processor 1702. However, it is to be appreciated that the SIM card 1720 can be manufactured into the DMH 1700, and updated by downloading data and software thereinto.

The DMH 1700 can process IP data traffic via the communication component 1710 to accommodate IP traffic from an IP network such as, for example, the Internet, a corporate intranet, a home network, a person area network, etc., via an ISP or broadband cable provider. Thus, VoIP traffic can be utilized by the DMH 1700 and IP-based multimedia content can be received in either an encoded or decoded format.

A video processing component 1722 (e.g., a camera) can be provided for decoding encoded multimedia content. The DMH 1700 also includes a power source 1724 in the form of batteries and/or an AC power subsystem, which power source 1724 can interface to an external power system or charging equipment (not shown) via a power I/O component 1726.

The DMH 1700 can also include a video component 1730 for processing video content received and, for recording and transmitting video content. A location tracking component 1732 facilitates geographically locating the DMH 1700. As described hereinabove, this can occur when the user initiates the feedback signal automatically or manually. A user input component 1734 facilitates the user initiating the quality feedback signal. The input component can include such conventional input device technologies such as a keypad, keyboard, mouse, stylus pen, and touch screen, for example.

Referring again to the applications 1706, a hysteresis component 1736 facilitates the analysis and processing of hysteresis data, which is utilized to determine when to associate with the access point. A software trigger component 1738 can be provided that facilitates triggering of the hysteresis component 1738 when the WiFi transceiver 1713 detects the beacon of the access point. A SIP client 1740 enables the DMH 1700 to support SIP protocols and register the subscriber with the SIP registrar server.

The DMH 1700, as indicated supra related to the communications component 1710, includes an indoor network radio transceiver 1713 (e.g., WiFi transceiver). This function supports the indoor radio link, such as IEEE 802.11, for the dual-mode GSM handset 1700. The DMH 1700 can also include an internal analog terminal adapter (ATA) 1742 for interfacing to analog devices such as modems and fax machines, for example. Alternatively, or in addition to the internal ATA 1742, an external ATA module 1744 can be provided for the same purposes as the internal ATA module 1742.

Figure 18:
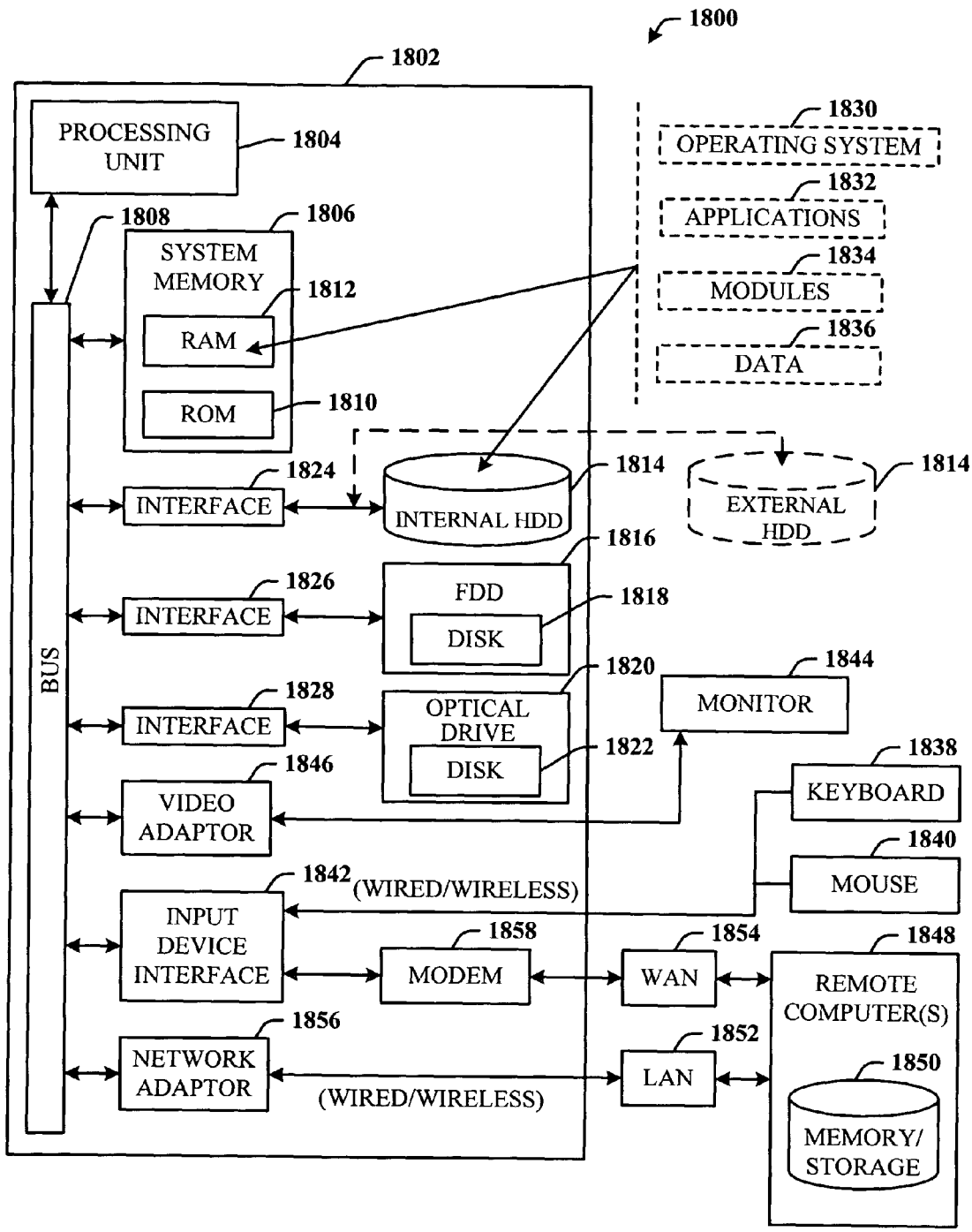
FIG. 18 illustrates a block diagram of a computer operable to provide storage and access such as for the UNC and/or HSS.

Referring now to FIG. 18, there is illustrated a block diagram of a computer operable to provide storage and access such as for the UNC and/or HSS. In order to provide additional context for various aspects thereof, FIG. 18 and the following discussion are intended to provide a brief, general description of a suitable computing environment 1800 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 18, the exemplary environment 1800 for implementing various aspects includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is to be appreciated that the innovation can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network 1852 through a wired and/or wireless communication network interface or adapter 1856. The adaptor 1856 may facilitate wired or wireless communication to the LAN 1852, which may also include a wireless access point disposed thereon for communicating with the wireless adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 19:
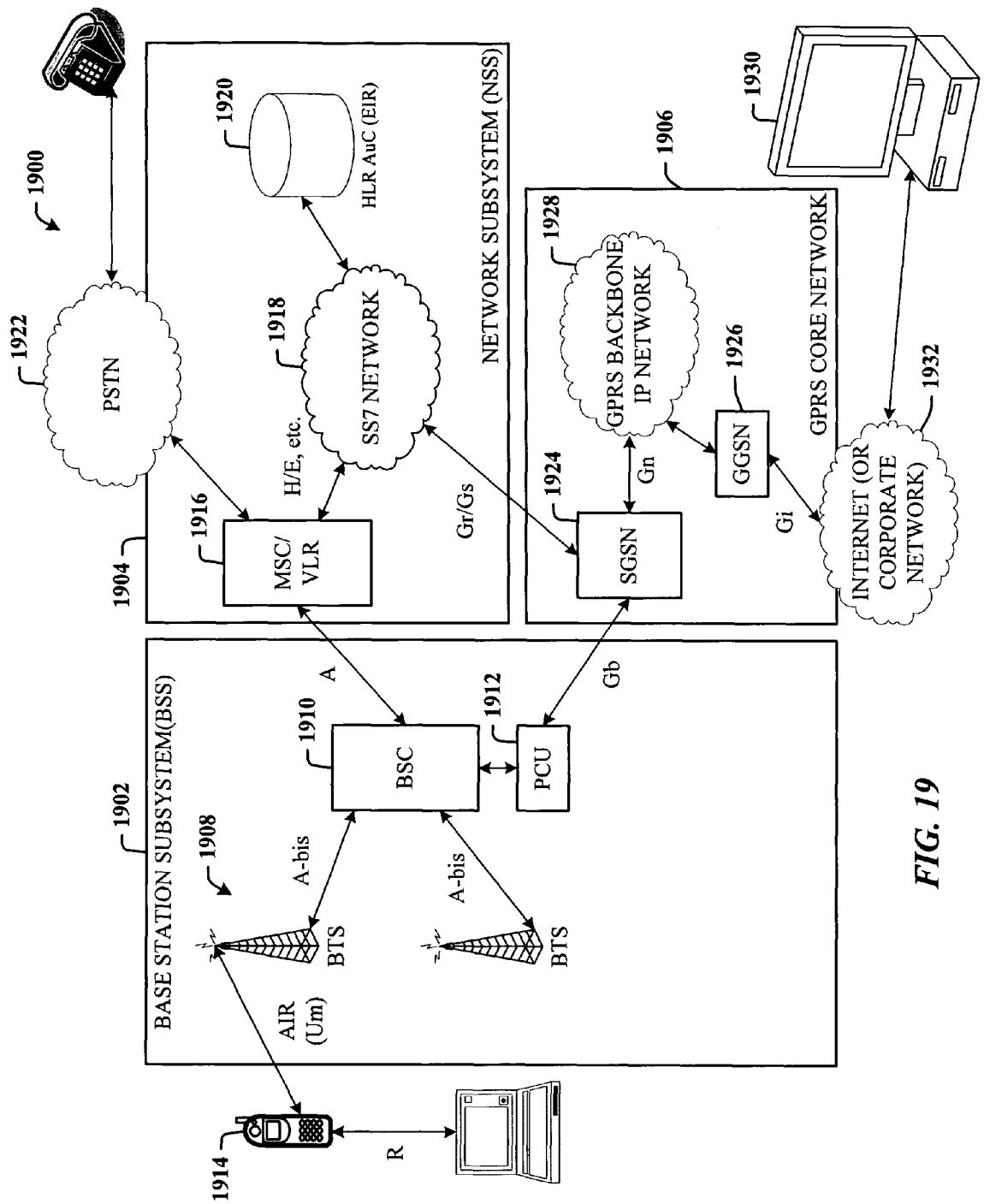
FIG. 19 illustrates an exemplary GSM network that facilitates DMS access control, location-based billing, and E911 mechanisms according to an innovative aspect.

FIG. 19 illustrates an exemplary GSM network 1900 that facilitates DMS access control, location-based billing, and E911 mechanisms according to an innovative aspect. The GSM system, designed as a 2G cellular communications system, utilizes TDMA (time division multiple access) technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 1900 includes a base station subsystem (BSS) 1902, a network subsystem (NSS) 1904 and a GPRS core network 1906. The BSS 1902 can include one or more base transceiver stations (BTS) 1908 and a base station controller (BSC) 1910 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 1912 is shown connected to the BTS 1910 although the exact position of this can depend on the vendor architecture. The BSS 1902 is connected by the air interface Um to a mobile terminal 1914. The BTS 1908 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorise the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 1910 provides the intelligence behind the BTS 1908. Typically, a BSC can have tens or even hundreds of BTSs 1908 under its control. The BSC 1910 handles allocation of radio channels, receives measurements from the mobile phones, and controls handovers from BTS to BTS (except in the case of an inter-MSC handover in which case control is in part the responsibility of the an MSC). One function of the BSC 1910 is to act as a concentrator such that many different low capacity connections to the BTS 1908 can become reduced to a smaller number of connections towards the MSC. Generally, this means that networks are often structured to have many BSCs 1910 distributed into regions near the BTS 1908 which are then connected to large centralized MSC sites.

The PCU 1912 can perform some of the equivalent tasks of the BSC 1910. The allocation of channels between voice and data can be controlled by the base station, but once a channel is allocated to the PCU 1912, the PCU 1912 takes full control over that channel. The PCU 1912 can be built into the base station, built into the BSC, or even in some architectures, it can be at an SGSN site.

The BSS 1902 connects to the NSS 1904 by an A interface. The NSS 1904 is shown containing an MSC 1916 connected via an SS7 network 1918 to an HLR 1920. The AuC and the EIR, although technically separate functions from the HLR 1920, are shown together since combining them can be performed in the network.

The combination of a cell phone 1914 and a SIM card (not shown) creates a special digital "signature" that includes a subscriber number which is sent from the cell phone 1914 to the nearest BTS 1908 asking that the subscriber of a particular network be allowed to use the network. The request is passed on along the network of BTS 1908 to the heart of a cellular network, the MSC 1916. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The MSC 1916 also contains the component called HLR 1920 that provides the administrative information required to authenticate, register and locate the caller as that network's subscriber. Once the HLR has received a log-on request, the HLR 1920 immediately checks the special "signature" contained in the request against the HLR special subscriber database. If the subscription is current, the MSC 1916 sends a message back to the phone via the network of BTS 1908 that indicates the caller is allowed to access the network. The name or code of that network will appear on the LCD screen of the cell phone 1914. Once this network "name" message appears on the phone LCD screen, it means the caller is connected to the network and able to make and receive calls.

The HLR 1920 registers which base station the cell phone is currently connected to, so that when the network MSC 1916 needs to route an incoming call to the cell phone number, it will first check the HLR 1920 to see where the cell phone is located. Periodically, the cell phone will send a message to the network indicating where it is, in a process called polling. The combination of the tracking function and the caller's unique digital signature allows the MSC 1916 to route that call to the precise base station the cell phone happens to be connected to, and then exclusively to the cell phone, even if a number of other subscribers are simultaneously connected to that base station.

When traveling to another cell while driving, for example, the HLR 1920 is automatically updated, and continues to monitor where exactly it should route the calls should the caller then move within range of another base station. This routing procedure means that out of hundreds of thousands of subscribers, only the correct cell phone will ring when necessary.

The NSS 1904 has a direct connection to the PSTN 1922 from the MSC 1916. There is also a connection to from the NSS 1904 to the GPRS core network 1906 via a Gr/Gs interface although this is optional and not always implemented. The illustrated GPRS Core Network 1906 is simplified to include a SGSN 1924 (connected to the BSS 1902 by the Gb interface) and a GGSN 1926. The SGSN 1924 and the GGSN 1926 are connected together by a private IP network 1928 called a GPRS backbone shown as the Gn reference point. A computer 1930 is depicted as connecting to the core network 1906 via an Internet or corporate network 1932.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere. What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates control of network access, comprising:
an unlicensed wireless network that facilitates communications between a client and a radio network, wherein the unlicensed wireless network includes a first broadband endpoint having a unique broadband endpoint internet protocol (IP) address and associated physical location data, the physical location data identifies a geographic location of the first broadband endpoint and is utilized to control DMS (dual mode services) access, facilitate dynamic location billing and E911 (emergency 911) location determination;
an access component of the radio network that controls access to the radio network by the client based on physical location information received from the client, the physical location information of the client is determined from the physical location data associated with the first broadband endpoint via which the client is accessing the unlicensed wireless network; the access component further includes:
a DMS authorization database (DAD) that facilitates authorization of the client to the radio network, the DAD includes information for a second broadband endpoint identified as a home broadband endpoint, wherein the information includes a broadband endpoint IP address; and
a presence server that receives presence messages from a presence user agent and updates a corresponding subscriber record in the DAD, the presence messages include an IMSI (international mobile subscriber identity) number, a broadband endpoint IP address, and location data; wherein, access of the client to the radio network is based upon comparing information associated with the first broadband endpoint via which the client is attempting to access the unlicensed wireless network with a list of approved broadband endpoints stored in the subscriber record; and
a billing component that facilitates billing based on the IP address of the first broadband endpoint, a different rate is billed if the client accesses the unlicensed wireless network from the home broadband endpoint compared with if the client accesses from a non-home broadband endpoint.

2. The system of claim 1, wherein the client is a dual-mode UMA (unlicensed mobile access) mobile handset.

3. The system of claim 1, wherein the unlicensed wireless network is a broadband IP network.

4. The system of claim 3, wherein the broadband IP network is a digital subscriber line (DSL) technology.

5. The system of claim 3, wherein the broadband IP network is at least one of a cable television IP network, a satellite network, and a WiMax network.

6. The system of claim 1, wherein the radio network is a GSM (global system for mobile telecommunications) network.

7. The system of claim 1, wherein the radio network is a GPRS (general packet radio services) network.

8. The system of claim 1, wherein the unlicensed wireless network is associated with one or more unique IP addresses of the geographic location.

9. The system of claim 1, wherein the access component includes a residential broadband gateway that uses a Point-to-Point Protocol over Ethernet (PPPoE) protocol to access the radio network.

10. The system of claim 1, wherein the unlicensed wireless network includes a broadband endpoint associated with physical location data, and the physical location data is utilized to control DMS access, facilitate dynamic location billing and E911 location determination.

11. The system of claim 1, wherein the client resides in a dual mode handset.

12. The system of claim 1, wherein the DAD resides in at least one of an HLR (home location register), HSS (home subscriber server), authentication, authorization and accounting (AAA) server, and a carrier-specific database.

13. The system of claim 1, wherein the DAD comprises a record format that includes IMSI data, a broadband endpoint IP address, broadband identity data, and location data.

14. The system of claim 1, wherein the DAD comprises a record format that includes at least one of IMSI (international mobile subscriber identity) data, a broadband endpoint IP address, a location billing code, broadband identity data, and location address, and location geographic coordinates data.

15. The system of claim 1, wherein the access component provides correlation of the first broadband endpoint or the second broadband endpoint and their respective broadband endpoint IP address with the IMSI number.

16. The system of claim 1, the rate billed for the home broadband endpoint is free of charge.

17. The system of claim 1, the rate billed for the first broadband endpoint not identified as the home broadband endpoint is greater than zero.

18. A system that facilitates management of network access, comprising:
an unlicensed wireless network that includes a broadband endpoint which facilitates communications between a handset and a broadband network, the broadband endpoint includes associated physical location data, the physical location data identifies a geographic location of the broadband endpoint and is utilized to control DMS (dual mode services) access, facilitate dynamic location billing and E911 (emergency 911) location determination;
a RADIUS (remote authentication dial-in user service) server, including a plurality of internet protocol (IP) addresses, assigns a unique IP address to the broadband endpoint;
a DMS (dual mode services) authorization database (DAD) that facilitates authorization of the handset to the broadband network;
a presence component that processes presence information;
wherein the presence component includes a presence server that receives presence messages from a presence user agent and updates a subscriber record, the presence messages include an IMSI (international mobile subscriber identity) number, a broadband endpoint IP address, and physical location data; and
a network controller component that facilitates validation of the broadband endpoint by comparing the IP address associated with the broadband endpoint via which the handset is attempting to access the broadband network with a list of IP addresses for access approved broadband endpoints stored in the DAD subscriber record.

19. The system of claim 18, wherein the broadband endpoint is a broadband modem.

20. The system of claim 18, wherein the DMS authorization database is an authentication, authorization and accounting (AAA) database.

21. The system of claim 18, wherein the unlicensed network is one of WiFi or Bluetooth.

22. The system of claim 18, wherein the presence component includes a presence user agent that notifies a radio network of one or more physical attributes of the broadband endpoint.

23. The system of claim 22, wherein the one or more physical attributes include at least one of broadband identity data, broadband endpoint IP address data, and physical location data.

24. The system of claim 18, further comprising a database that associates the broadband endpoint identity and the broadband endpoint IP address with the IMSI number.

25. The system of claim 18, wherein the network controller component queries a subscriber database to validate the broadband endpoint during a registration procedure.

26. The system of claim 18, wherein the handset is a UMA (unlicensed mobile access) handset.

27. The system of claim 18, wherein the geographic location of the broadband endpoint is utilized to control DMS access to the network, provide dynamic location-based billing, and provide a location of the handset in accordance with E911 requirements.

28. The system of claim 18, wherein the handset includes an analog terminal adapter (ATA).

29. The system of claim 28, wherein a second ATA interfaces to the handset and is external to the handset.

* * * * *